(12) United States Patent
Amin et al.

(10) Patent No.: US 12,135,532 B2
(45) Date of Patent: Nov. 5, 2024

(54) FLOW MONITOR AND POWER GENERATOR AND METHODS FOR FLOW MONITORING AND POWER GENERATION

(71) Applicant: Guard Dog Valves LLC, Naples, FL (US)

(72) Inventors: Himanshu Subhash Amin, Solon, OH (US); Michael E. Giorgi, Hudson, OH (US)

(73) Assignee: Guard Dog Valves LLC, Naples, FL (US)

( * ) Notice: Subject to any disclaimer, the term of this patent is extended or adjusted under 35 U.S.C. 154(b) by 97 days.

(21) Appl. No.: 17/005,511

(22) Filed: Aug. 28, 2020

(65) Prior Publication Data

US 2021/0124323 A1   Apr. 29, 2021

Related U.S. Application Data

(60) Provisional application No. 62/926,902, filed on Oct. 28, 2019.

(51) Int. Cl.
G05B 19/04 (2006.01)
G05B 19/042 (2006.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; F05B 2220/20; F03B 13/00
See application file for complete search history.

(56) References Cited

U.S. PATENT DOCUMENTS

| | | | | |
|---|---|---|---|---|
| 2002/0029883 A1* | 3/2002 | Vinegar | ................ | E21B 43/123 166/250.03 |
| 2002/0140233 A1* | 10/2002 | Zeier | ....................... | F03B 13/00 290/43 |
| 2007/0246550 A1* | 10/2007 | Rodenbeck | ........ | G05D 23/1353 236/12.11 |
| 2008/0067813 A1* | 3/2008 | Baarman | ................. | C02F 9/005 290/43 |
| 2008/0284174 A1* | 11/2008 | Nagler | .................. | F03B 13/105 290/52 |
| 2011/0215268 A1* | 9/2011 | Minervini | ............... | F01D 15/00 251/129.01 |
| 2013/0175802 A1* | 7/2013 | Breau | ..................... | F03B 13/10 290/54 |

(Continued)

FOREIGN PATENT DOCUMENTS

CN         108223243 A  *  6/2018

*Primary Examiner* — Christopher W Carter
(74) *Attorney, Agent, or Firm* — Amin, Turocy & Watson, LLP

(57) ABSTRACT

Techniques regarding material flow regulation and power generation are provided herein. For example, one or more embodiments described herein can regard a device or system for regulating material flow and power generation. The system can comprise a processor that executes computer executable components stored in a memory. The system can also comprise a coupling component which can secure the system to a pipe. The system can further comprise a power generation component that can generate power from material flowing through the pipe and a power output component which can output power generated by the power generation component.

20 Claims, 25 Drawing Sheets

(56) References Cited

U.S. PATENT DOCUMENTS

| | | | | |
|---|---|---|---|---|
| 2015/0102603 A1* | 4/2015 | Schaefer | ............... | G01F 15/00 |
| | | | | 290/52 |
| 2015/0125767 A1* | 5/2015 | Wake | ............... | H01M 8/0491 |
| | | | | 429/414 |
| 2016/0139575 A1* | 5/2016 | Funes | ............... | G06N 5/047 |
| | | | | 700/275 |
| 2017/0318761 A1* | 11/2017 | Rainone | ............... | B05B 12/04 |
| 2018/0023536 A1* | 1/2018 | Bhanushali | ............ | F03B 13/086 |
| | | | | 290/43 |
| 2018/0038229 A1* | 2/2018 | Rubinshtein | ............ | F01D 1/02 |
| 2018/0364664 A1* | 12/2018 | Gustafson | ............ | G05B 19/042 |
| 2019/0190999 A1* | 6/2019 | Cheung | ............... | H04L 67/55 |

\* cited by examiner

FLOW MONITOR AND POWER GENERATOR AND METHODS FOR FLOW MONITORING AND POWER GENERATION

CROSS-REFERENCE TO RELATED APPLICATIONS

This application claims priority to U.S. Provisional Patent Application Ser. No. 62/926,902 filed on Oct. 28, 2019, entitled "FLOW MONITOR AND POWER GENERATOR AND METHODS FOR FLOW MONITORING AND POWER GENERATION." The entirety of the aforementioned application is incorporated by reference herein.

TECHNICAL FIELD

This application relates to devices and techniques for flow monitoring and power generation.

BACKGROUND

The world's appetite for energy increases every year. According to the International Energy Agency data from 1990 to 2008, average energy use per person increased 10% while world population increased 27%. As a result, increases in energy efficiency are becoming ever more important. While society strives for increased reliance on renewable energy sources, natural gas is still used in most American households. In fact, according to information procured by the U.S. Energy Information Administration, American natural gas consumption has been steadily increasing.

Energy consumption places strain on infrastructure, power generation entities, environment, and bank accounts. Therefore, targeting and reducing energy waste while utilizing available energy resources continues to become ever more important. Where waste reduction and increased energy efficiency can easily occur in a consumer's own home, detrimental impacts of energy consumption can be reduced.

The above-described background relating to power generation and flow monitoring is merely intended to provide a contextual overview of some current issues and is not intended to be exhaustive. Other contextual information may become further apparent upon review of the following detailed description.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

According to one or more embodiments, a system is described herein. The system can comprise a processor that executes computer executable components stored in a memory. The system can include a coupling component that secures the system to a pipe. The system can also include a power generation component that generates power from material flowing through the pipe and can additionally include a power output component that outputs power generated by the power generation component.

In another example embodiment, a method is described herein. The method comprises determining, by a system comprising a processor and coupled to a pipe, a flow of material through the pipe, determining, by the system, a condition external to the system, in response to a determination that the condition external to the system is not occurring: generating, by a system coupled to a pipe, electricity from material flow through the pipe, outputting, by the system, the electricity, and in response to a determination that the condition external to the system is occurring: regulating, by the system, the flow of material.

In yet another embodiment, a computer program product is described herein. The computer program product facilitates operations of a valve device. The computer program product can comprise a readable storage medium having program instructions embodied therewith, the program instructions executable by a processor to cause the processor to: enable a turbine of the valve device to generate electricity, cause an output component to direct the electricity generated by the turbine to an output location of the valve device, determine the amount of electricity generated by the turbine, and store information associated with determining the amount of electricity to a memory of the valve device.

In some embodiments, elements described in connection with the disclosed systems can be embodied in different forms such as a computer-implemented method, a computer program product, or another form.

DESCRIPTION OF THE DRAWINGS

Various non-limiting embodiments of the subject disclosure are described with reference to the following figures, wherein like reference numerals refer to like parts throughout unless otherwise specified.

DETAILED DESCRIPTION

Figure 1A:
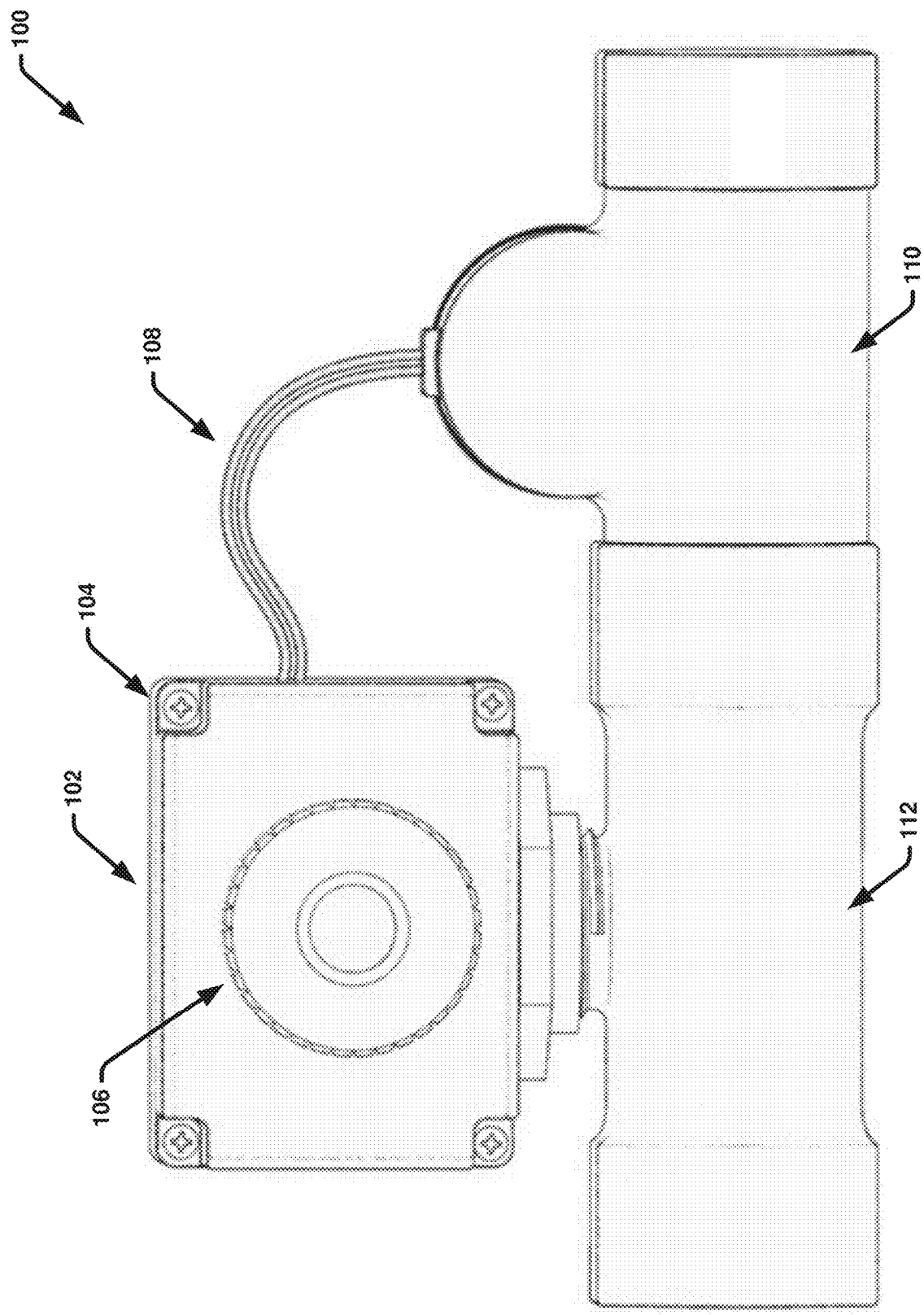
FIGS. 1A-1D are exemplary representations of a flow control and power generation device in accordance with one or more example embodiments described herein.
Figure 1B:
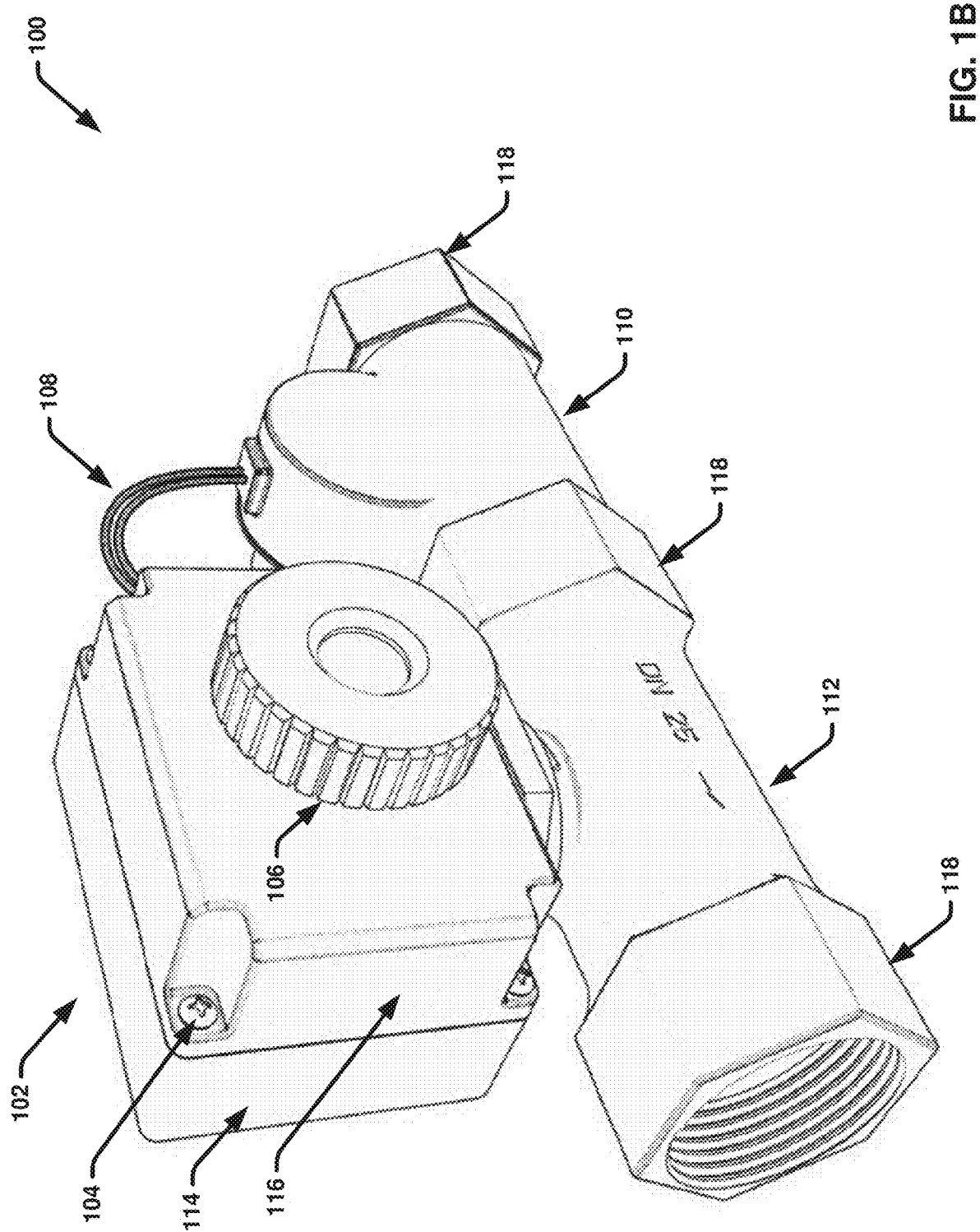
Figure 1C:
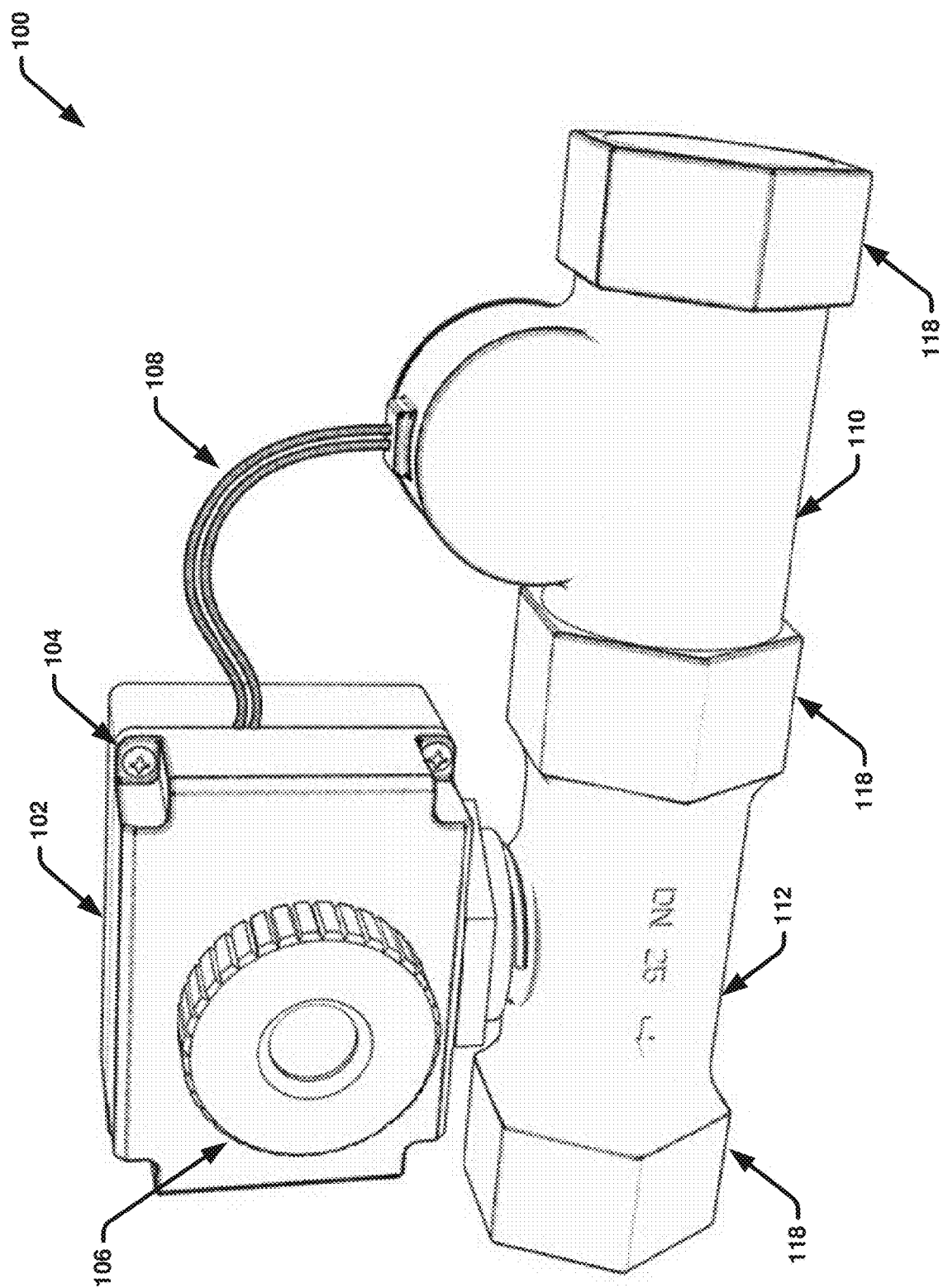
Figure 1D:
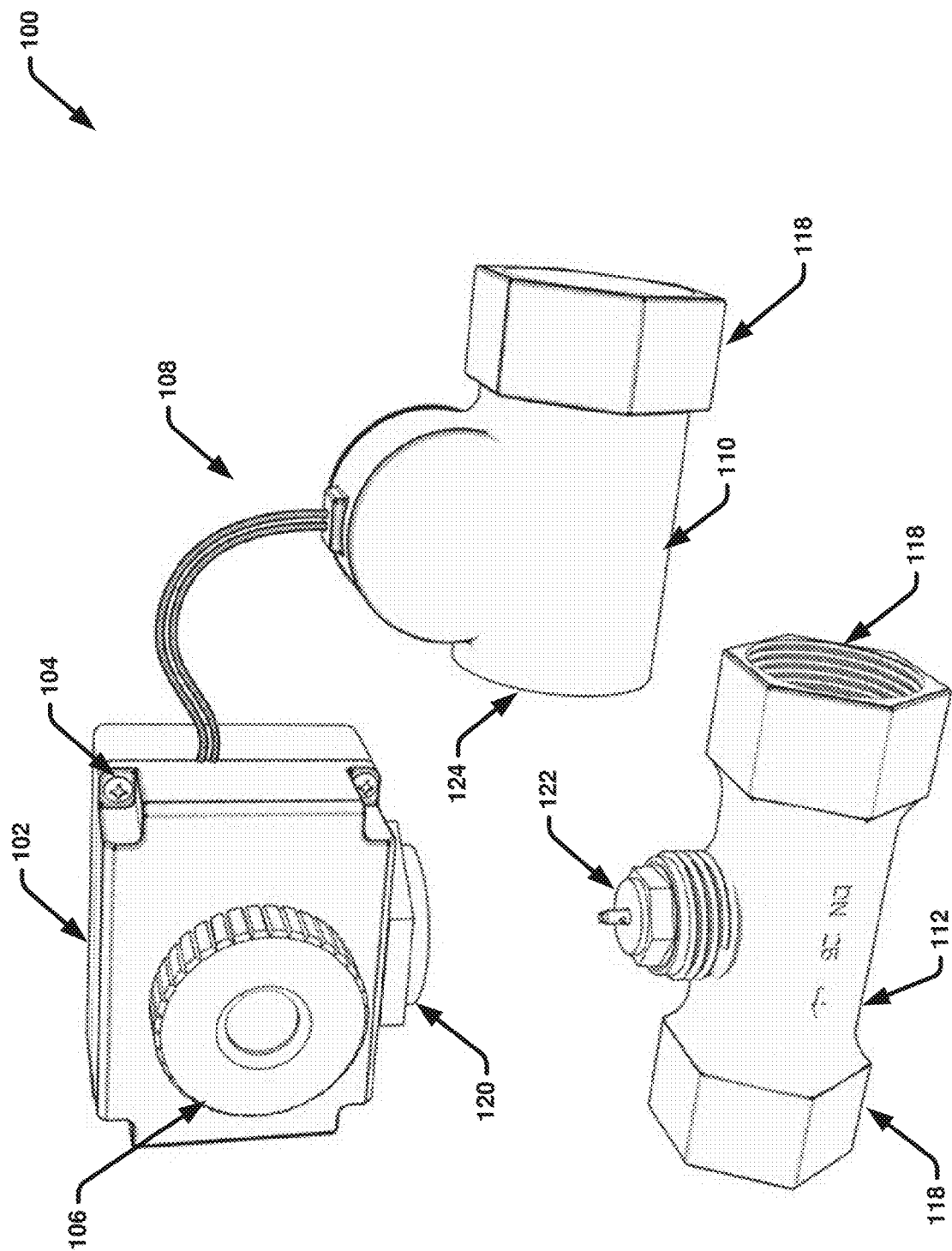
Figure 2A:
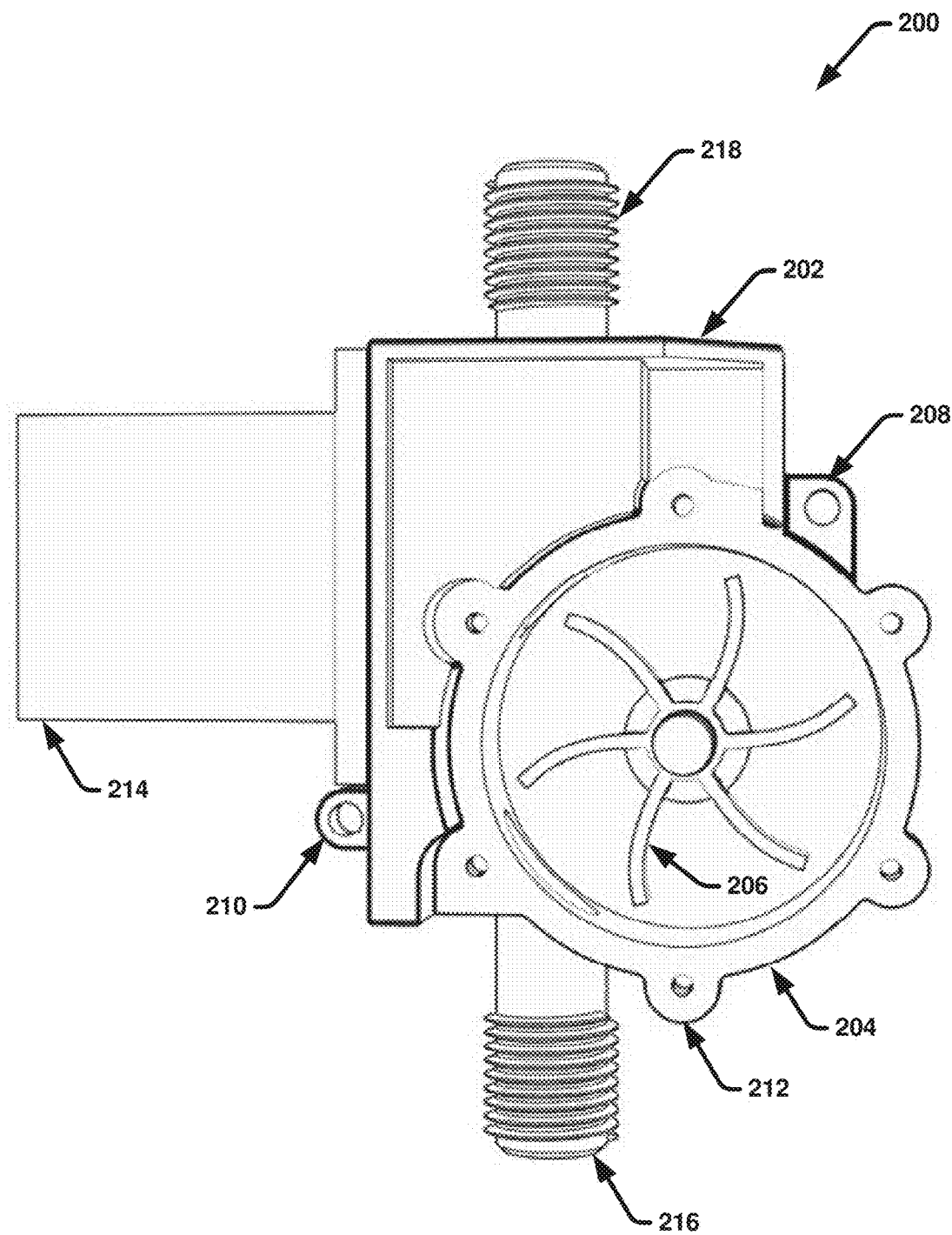
FIGS. 2A-2G are exemplary representations of a flow control and power generation device in accordance with one or more example embodiments described herein.
Figure 2B:
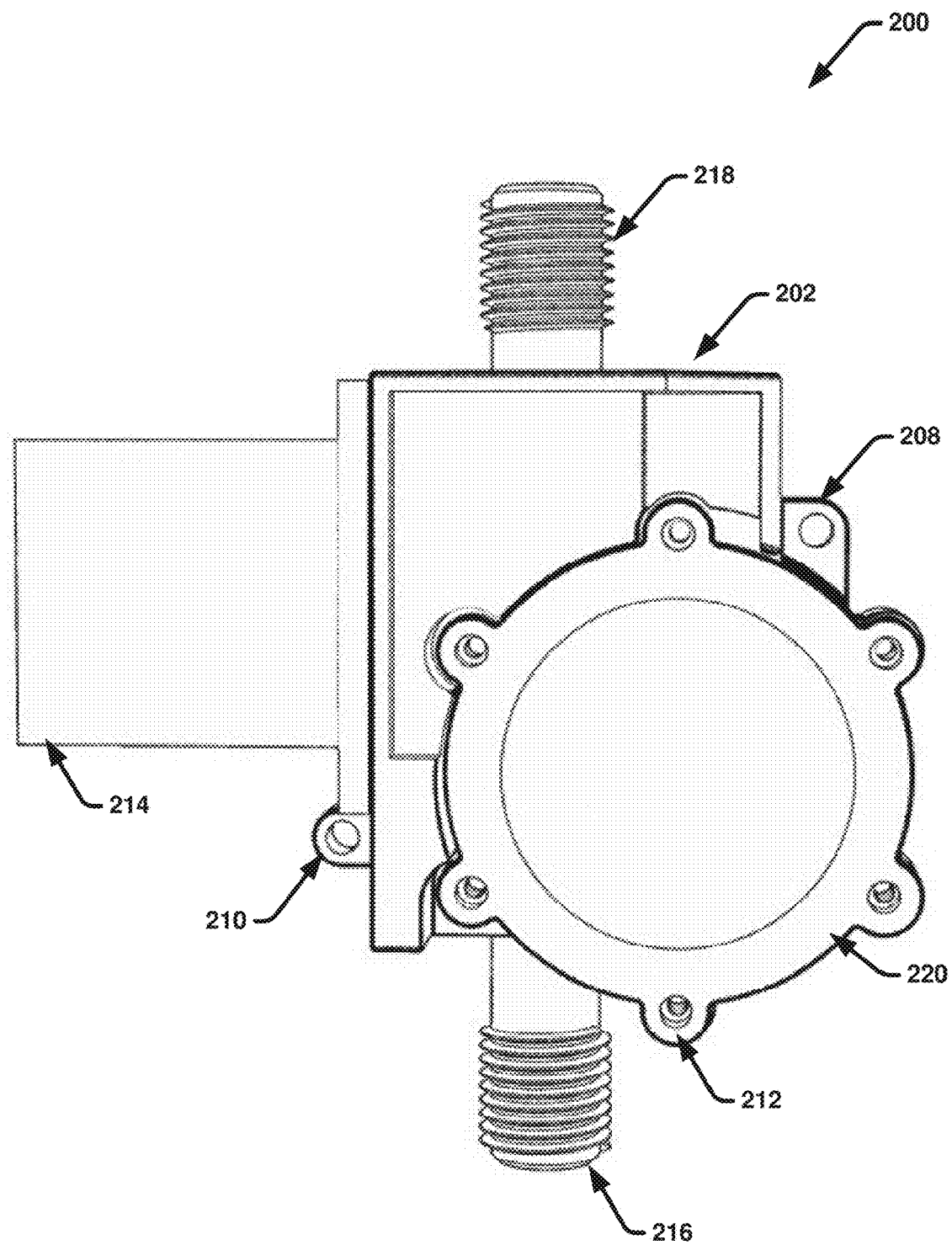
Figure 2C:
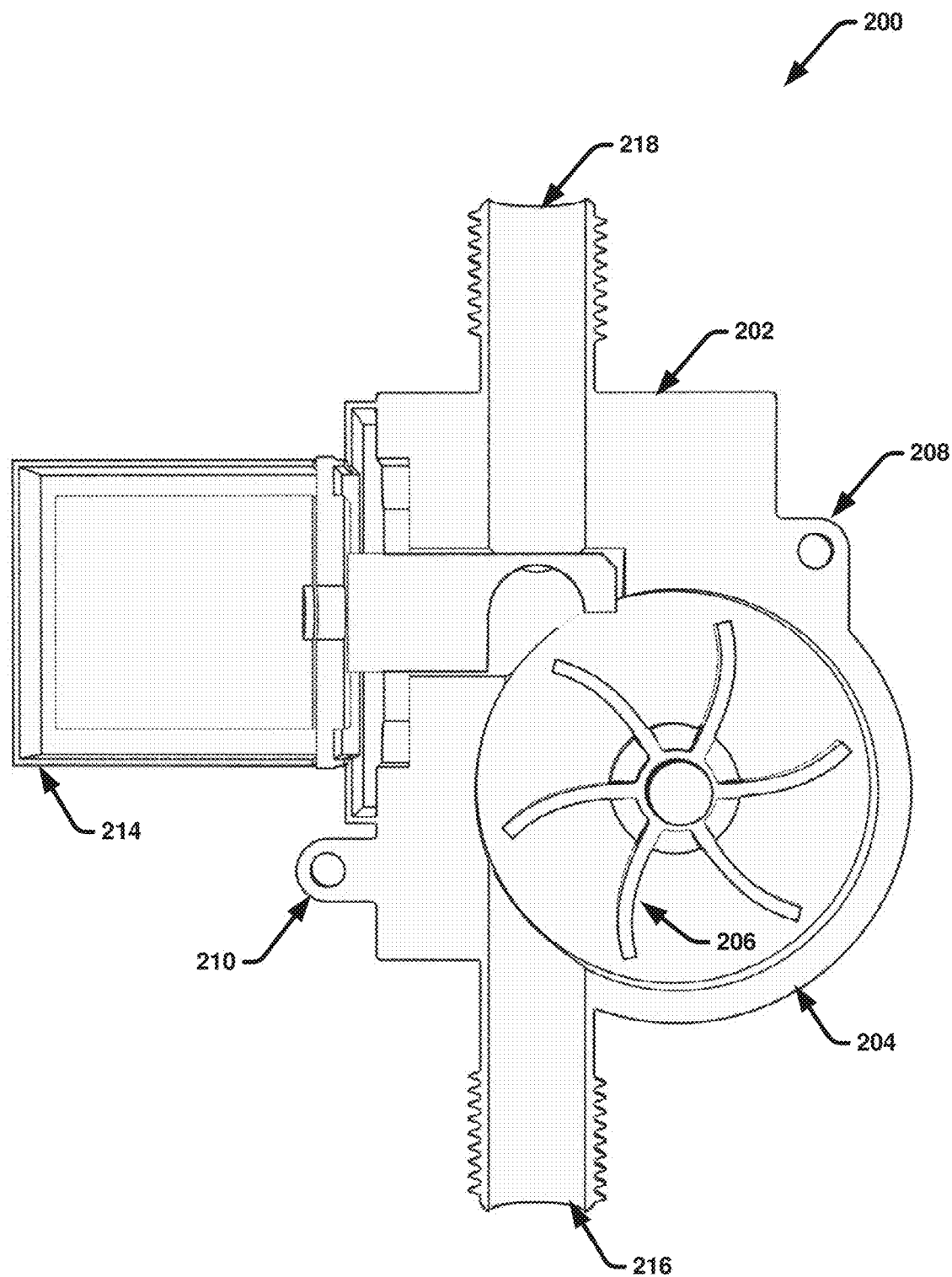
Figure 2D:
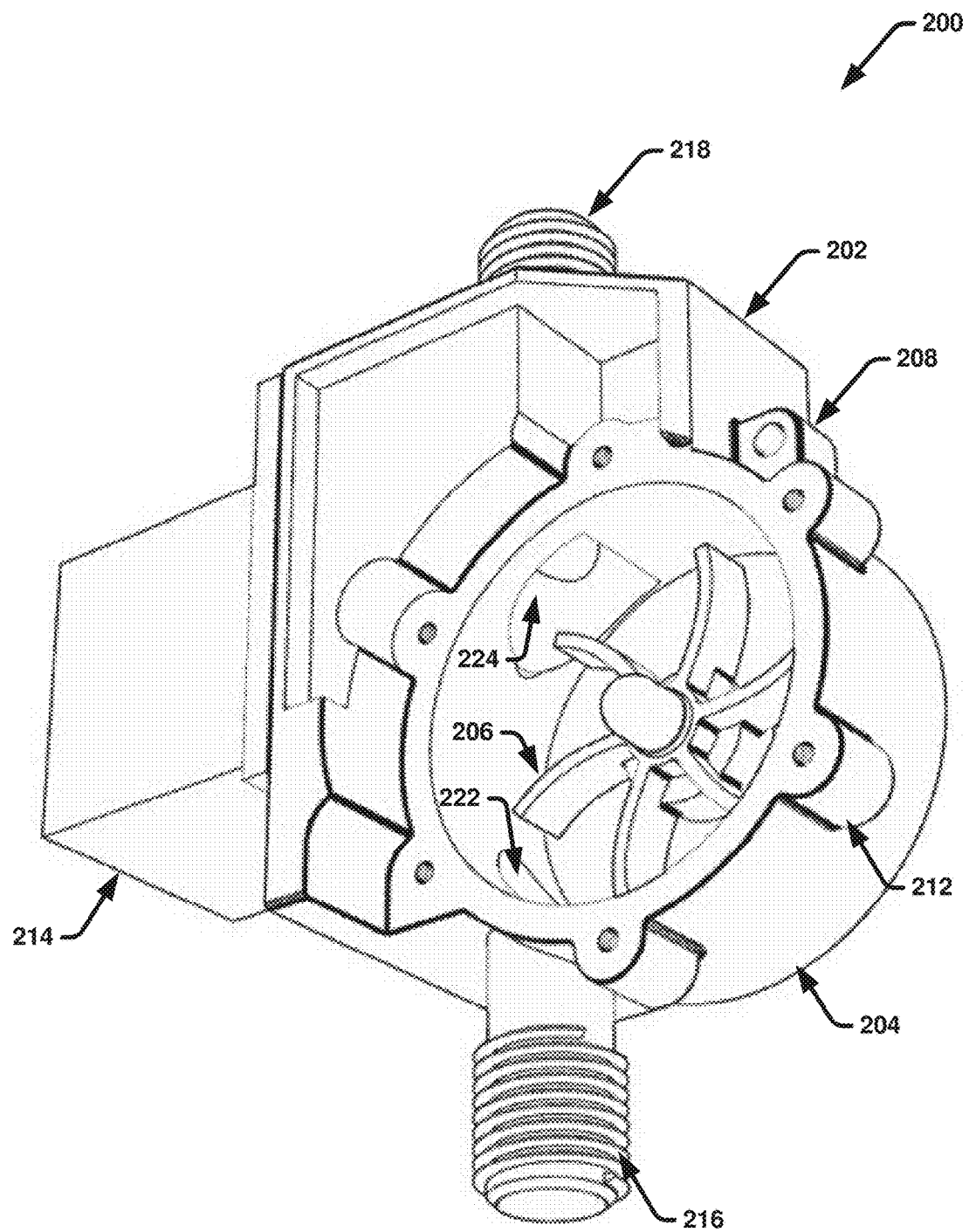
Figure 2E:
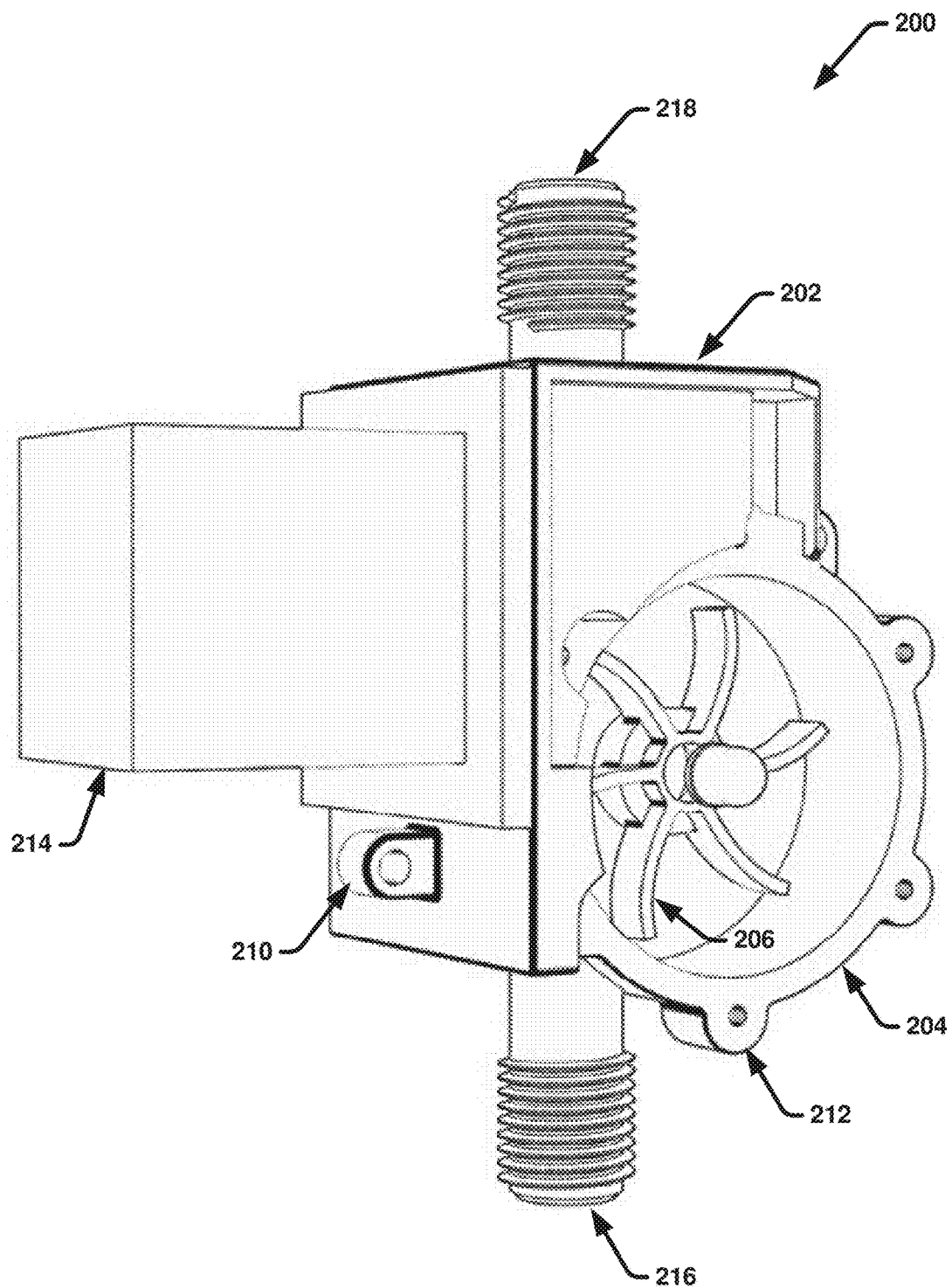
Figure 2F:
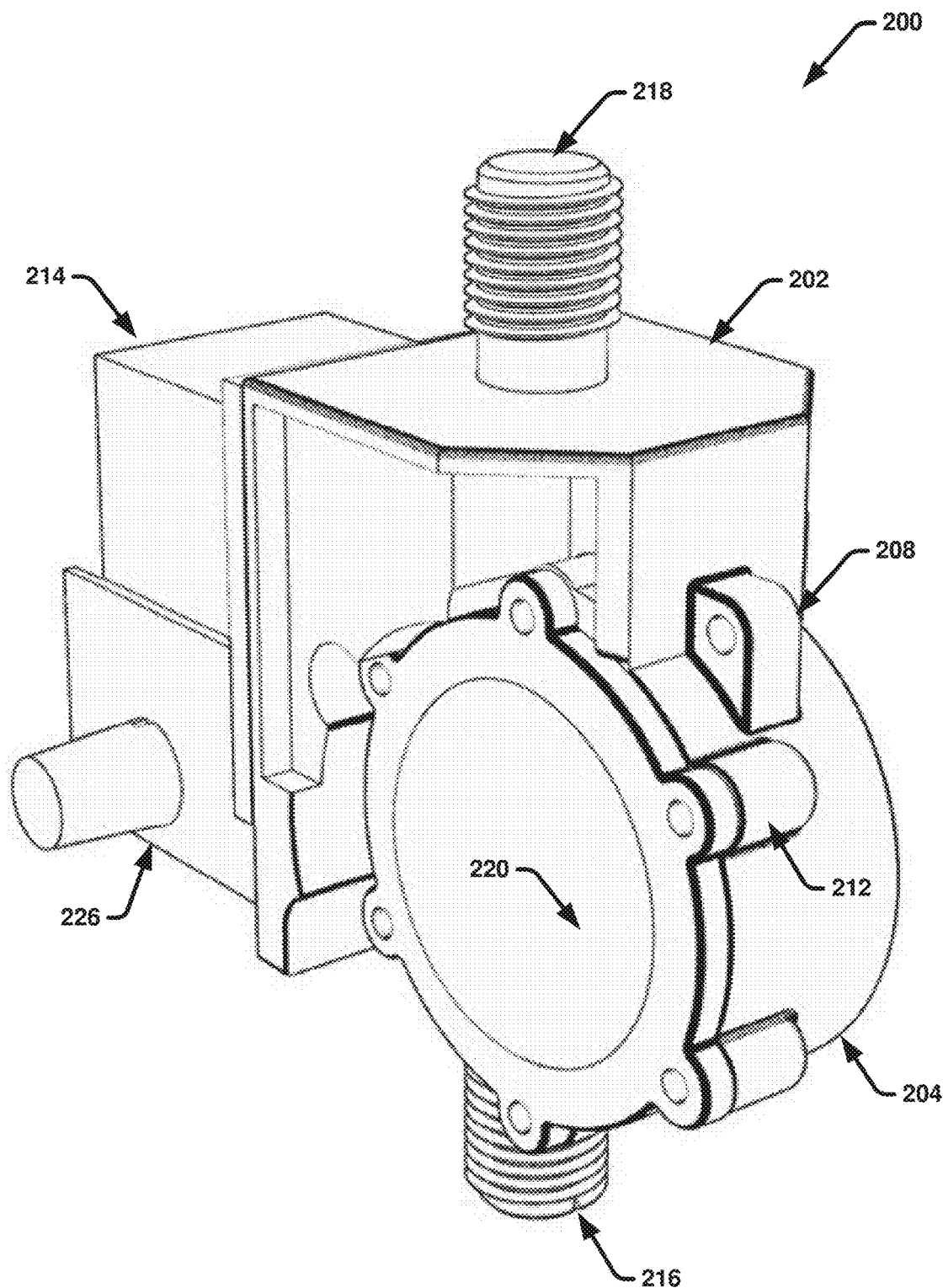
Figure 2G:
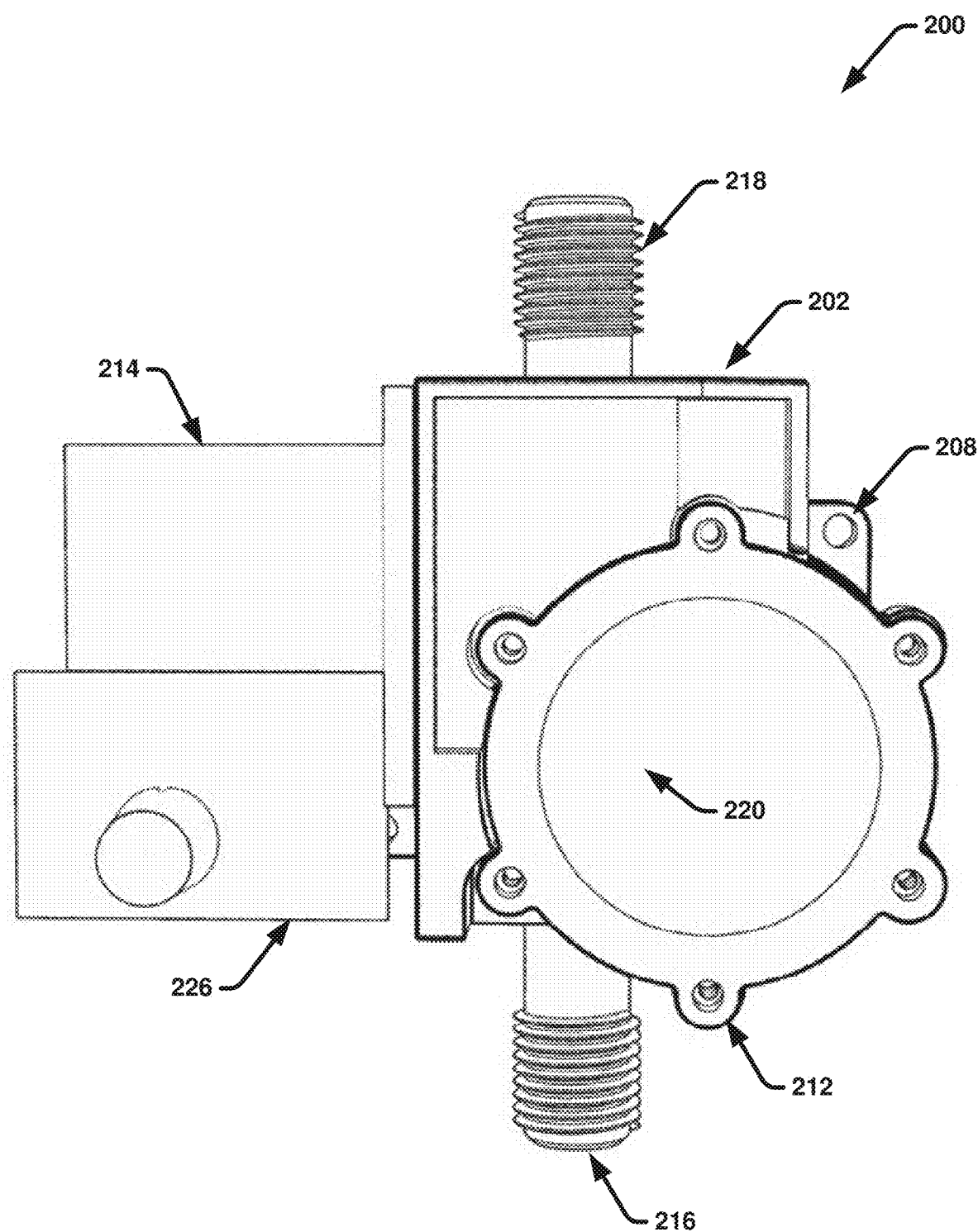

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide methods and systems that monitor and regulate flow and generate power. Various embodiments herein enable electricity to be generated from the flow of material (e.g., water, natural gas, sewage, etc.) through a pipe. For example, according to an embodiment, a device can be retrofitted to a home natural gas line/pipe. By coupling the device to a pipe, electricity can be generated from the flow of natural gas through the natural gas pipe. The power generated can be output to various locations. For instance, power can be stored to a battery coupled to the device. Other embodiments facilitate charging of units connected to the device. For instance, a mobile phone can be charged with power generated by the device.

In other various embodiments herein further allow for flow characteristics of material flow through a pipe, such as the natural gas line, to be monitored. For instance, flow rate through the pipe, and subsequently a flow-monitoring device, can be monitored and compared with other variables. For example, natural gas consumption can be monitored in association with time of day, or the number of people present inside of a building. The flow-monitoring device can be registered with "smart home" systems to allow access to additional information, such as which individual person is inside the home by gathering information from a mobile device of that person registered with the smart home.

Further embodiments can regulate flow through a pipe. For example, a device can be coupled to a water line of a house where in addition to various features such as power generation and flow monitoring, the device can regulate flow. For instance, the device can reduce or even stop fluid flow through the pipe-regulation can occur in accordance with a variety of conditions (e.g., user preferences, leak detection, emergency condition . . . ). A user of the device can regulate flow via physical or remote interaction with the device. The device can have physical buttons, switches, levers, etc. or a touchscreen to enable a user to regulate flow while other embodiments allow for remote control of the device. For example, a dedicated website or application (e.g. smartphone app) can be used to remotely control the device to regulate material flow. Additional embodiments can include a dedicated remote corresponding to the device for remote control. Further embodiments include artificial intelligence and machine learning, thus enabling the device to regulate flow in response to various conditions, such as abnormalities, absence of people in a building, etc.

Additional embodiments can respond to external conditions, such as a flooding basement, by regulating material flow through the line, for instance, by stopping material flow through the line. A sensor can be coupled (physically or wirelessly) to a device which can slow or stop flow through a pipe in response to a condition been satisfied (or not satisfied, depending on the condition). Such conditions can include a fire, flood, material leak, etc.

The above aspects of the disclosure and/or other features of respective embodiments thereof are described in further detail with respect to the respective drawings below. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIGS. 1A-1D illustrate diagrams of an example, non-limiting device 100 that facilitates material flow control/regulation and power generation in accordance with one or more embodiments of the disclosed subject matter. In accordance with various exemplary embodiments, device 100 (and other systems described herein) can be installed on or within a utility line (not pictured), such as a water pipe or natural gas pipe, sewage pipe, etc. to enable at least the features described herein.

Device 100 can comprise a housing 102 that can securely contain a variety of components. For instance, housing 102 can contain a power storage component (e.g., a battery) or a controller. The housing can be air/waterproof to protect parts/components stored within the housing. A controller contained within a housing 102 can comprise a processor and a memory. Additional components can be optionally included such as a wireless receiver/transmitter (not pictured) to communicate with external devices using protocols such as Wi-Fi, Bluetooth, cellular signals (e.g. 3G, 4G, 5G), radio, etc. Housing 102 can comprise a first half 114 and a second half 116. The first half 114 and the second half 116 can be secured to each other by a plurality of screws 104.

The housing 102 can comprise a knob 106 that can be used for a variety of functions inherent to the device 100. For instance, knob 106 can be used to manually regulate material flow through a pipe to which the device 100 is coupled, whereby rotating the knob can cause a component to fully allow or stop material flow through a pipe, or to reduce flow to a specified amount, for instance, by covering or exposing a material flow passage in the device 100 or increasing a load on a turbine of a generator of the device 100. Additional components for such material flow regulation will be later discussed in greater detail.

According to an embodiment, knob 106 can enable/disable various functions of the device 100. For instance, knob 106 can power on or off the device 100. Knob 106 can be removable to gain access to the inside of the housing 102 without needing to remove the plurality of screws 104.

According to an embodiment, wire 108 can communicate information between a controller within a housing 102 and a component within a pipe segment 110. For instance, in the case of a valve being housed within pipe segment 110, the controller can send a signal to the valve to move to a position, such as open, closed, or partially closed, thereby regulating material flow. Other embodiments can employ wireless communication between the controller and the component.

According to another embodiment, a generator (e.g., a turbine generator) housed within a pipe segment 110 can generate power from material flow through the pipe segment 110. The generator can comprise a turbine, turbo-generator, etc., whereby rotation of the turbine by way of material flow through the pipe segment 110 can generate electricity. The electricity generated can be transferred by wire 108 to, for instance, a controller within the housing 102 or a battery within the housing 102. Other power transfer protocols, such as inductive charging can be utilized to move generated energy.

Further embodiments can utilize the turbine or turbo-generator as an impeller, thus enabling material flow rates to be increased above a natural state by electrically-powered-rotation of the impeller. For instance, power stored in a battery of the system 100 can be utilized to power a motor to drive the impeller, this increasing material flow speed. Other embodiments can cause the impeller to push material opposite the direction of natural flow (e.g. out of a structure such as a house or building). This can be beneficial for emptying pipes before maintenance or replacement. For example, a water heater of a home may require replacement. The system 100 can thereby pull water out of the line to which the system 100 and water heater are attached, thus preventing leakage/spillage when the water line is separated from the water heater. System 100 can be utilized in other pipes or utility lines including natural gas and sewer applications.

The generator and valve of a system 100 can possess overlapping functionality (e.g. stopping of a turbine can stop flow and allowing movement of a turbine can allow material flow, etc. as can opening or closing a valve). In other embodiments, the generator can act as a valve device.

The pipe segment 110 can comprise an end 118. End 118 can comprise threads that match utility pipes or can otherwise facilitate attachment to utility pipes or lines. For instance, end 118 can comprise a click-on or quick-connect/coupler fitting. A gasket comprising a gasket material (e.g., nitrile, neoprene, rubber, spiral wound, PTFE, EPDM, silicone, fluoro-elastomer, epichlorohydrin, halogenated butyl, graphite, etc.) can be utilized in an end 118 in order to aid preventing escape of gas or liquids (or solid materials). Pipe segment 110 can comprise an end 124. Like end 118, end 124 can comprise threads similar to those which can be used by end 118 or can comprise opposite threads (e.g., male vs. female). End 124 can be utilized with gasket(s), can comprise a variety of materials, and can comprise a variety of connection types. End 118 or end 124 can be considered a coupling component, whereby coupling of a device 100 to a pipe or utility line can be enabled by securing to a pipe or utility line.

According to an embodiment, pipe segment 110 can be coupled to a pipe segment 112. Pipe segment 112 can comprise one or more of an end 118 and/or one or more of an end 124. Pipe segment 112 can include an attachment part 122 which can correspond with an attachment part 120 of the housing 102. Attachment part 122 and attachment part 120 can allow for physical coupling of the housing 102 to the pipe segment 122. Attachment part 122 and attachment part 122 can additionally allow for material or information to be transferred. For instance, a sensing unit (e.g., a sensor) disposed in a pipe segment 112 can communicate through the attachment part 122 and attachment part 120 such that a signal sent from the sensor can be received by a controller contained within the housing 102. According to another embodiment, a valve or generator, such as one similar to that in pipe segment 110, can be implemented in a pipe segment 112 whereby power can be transferred through the attachment parts 120 and 122.

Other embodiments can comprise a single pipe segment, wherein the single pipe is not segmented, and pipe segment 110 and pipe segment 112 are different sides of a single pipe.

Device 100 can comprise peripheral ports, for instance, in housing 102. Peripheral ports can allow for power to be supplied to a product/component coupled to the device 100 via the peripheral ports. For example, device 100, or specifically the housing 102, can comprise a USB port (e.g., USB A, B, C, etc.) Other peripheral ports can include a power port, charging port, diagnostic port, etc. Other embodiments utilize the peripheral ports to charge a battery within the housing 102 from an external power source, thus allowing the device 100 to act as additional battery storage for an external power source.

Device 100 can comprise Artificial Intelligence ("A.I.") functionality, as will be later discussed in greater detail. Likewise, device 100 can comprise a user interface which will be later discussed in greater detail.

A variety of materials can be utilized in the construction of device 100. For instance, the device 100 can comprise at least one of cast iron, PVC (polyvinyl chloride), chromed brass, chromed copper, galvanized iron, copper (rigid and flexible), CPVC (chlorinated polyvinyl chloride), PEX (cross-linked polyethylene), black iron, various plastics, etc.

Referring now to FIGS. 2A-2G, illustrated are diagrams of an example, nonlimiting device 200 that facilitates material flow control and power generation in accordance with one or more embodiments of the disclosed subject matter. In accordance with various exemplary embodiments, device 200 (and other systems described herein) can be installed on or within a utility pipe, such as a water line or natural gas line, to enable at least the features described herein.

Device 200 can comprise a main body 202. Main body 202 can comprise a hollow segment(s) (e.g. openings 222 or 224) which allow the passage of material through the device 200. The hollow segment(s) can terminate at end 216 or end 218. End 216 or end 218 can comprise threads that match utility pipes or can otherwise facilitate attachment to utility pipes or lines. For instance, end 216 or end 218 can comprise a click-on or quick-connect/coupler fitting. Gasket material (e.g., nitrile, neoprene, rubber, spiral wound, PTFE, EPDM, silicone, fluoro-elastomer, epichlorohydrin, halogenated butyl, graphite, etc.) can be utilized at an end 216 or end 218 in order to aid preventing escape or gas or liquids (or solid materials). End 216 or end 218 can be considered a coupling component, whereby coupling of a device 200 to a pipe or utility line can be enabled by securing to a pipe or utility line.

Device 200 can comprise a generator 206 within a housing 204. According to an embodiment, generator 206 can comprise an electromagnetic generator as shown in FIGS. 2A-2G. Generator 206 can comprise a turbine which can be rotated by flow of material (e.g., natural gas, water, steam, sewage, air, etc.) to convert rotational kinetic energy into electrical energy.

Further embodiments can utilize the turbine or turbo-generator as an impeller, thus enabling material flow rates to be increased by powered-rotation of the impeller. For instance, power stored in a power storage component (e.g., a battery or a capacitor) of the system 200 can be utilized to power a motor to drive the impeller, this increasing material flow speed. Other embodiments can cause the impeller to push material opposite the direction of natural flow (e.g. out of a house or building). This can be beneficial for emptying pipes before maintenance. For example, a water heater of a home may require replacement. The system 200 can thereby push water out of the line to which the system 200 and water heater is attached, thus preventing leakage/spillage when the water line is separated from the water heater. System 200 can be utilized in other pipes or utility lines including natural gas and sewer applications.

The housing 204 can comprise openings 222 or 224 (e.g., passages) leading to ends 216 or 218, respectively such that material flowing in and out of ends 216 or 218 must pass through the turbine. Other embodiments can bypass the turbine via alternate material flow channels. The generator 206 can comprise a clutch or can be otherwise disengaged from the turbine so that the turbine can free spin, for instance, in a scenario where pressure is to be prevented from increasing at an upstream side of the material flow.

In other embodiments, a turbine of a generator 206 can be smaller (e.g. smaller diameter or smaller height) than the housing 204. This way, some material can always bypass the turbine even in the event of a complete stop of turbine rotation. This way, material backups can be prevented even in the event of a malfunction of device 200.

In yet another embodiment, the generator 206 can comprise a locking component which can prevent a turbine of the generator 206 from rotating. The locking component can be attached to the main body 202 or housing 204 and can removably engage with the turbine to prevent turbine rotation. By preventing rotation of the turbine material flow can be halted. In other embodiments, material flow can be slowed by increasing an electrical load on the generator or by utilizing a braking component to reduce rotational speed of the turbine. In further embodiments, a gate can be disposed inside the housing 204, inside an end 216 or 218, or otherwise in the flow path of a material and can be utilized in order to place a barrier in the flow path of the material so that material flow can be regulated (e.g. slowed) or stopped. For instance, a gate of the main body 202 or housing 204 can removably cover openings 222 or 224.

The housing 204 can comprise a plurality of cover attachment points 212. Cover attachment points 212 can be utilized to secure a cover 220 to the housing 204. Cover 220 can be removably attached to the housing 204 to facilitate access for maintenance, replacement, inspection, etc. A gasket material can be disposed between the housing 204 and cover 220 to prevent any escape of material. Other embodiments do not use a gasket material and comprise materials and properties that do not require a gasket material in order to prevent leakage or seepage from the housing 204 or cover 220. For instance, the housing 204 and cover 220 can be precision machined or formed to provide for an air and liquid-tight fit between the housing 204 and cover 220. Fasteners such as screws, bolts, nuts, rivets, adhesives, etc. can be utilized to secure the cover 220 to the housing 204.

Mounting point 208 and mounting point 210 can each be utilized for a variety of attachment implementations. For instance, an accessory can be mounted to either of mounting point 208 or mounting point 210. In other embodiments, mounting point 208 or mounting point 210 can be utilized to mount the device 200 to a structure. For example, mounting point 208 or mounting point 210 can attach to ceiling of a building can be utilized to further secure the device 200 in place. Additional brackets can be utilized to mount the device 200 in a proper position or to reduce a load/stress on a pipe or utility line to which the device 200 is attached. Mounting point 208 or mounting point 210 can be considered a coupling component, whereby coupling of a device 200 to a pipe or utility line can be enabled by securing to a pipe or utility line via a bracket or other attachment method.

The device 200 can comprise a compartment 214. Compartment 214 can securely contain a variety of components. For instance, compartment 214 can contain a battery or a controller. A controller contained within a compartment 214 can comprise a processor and a memory. Additional components can be optionally included such as a wireless receiver/transmitter to communicate with external devices using protocols such as Wi-Fi, Bluetooth, cellular signals (e.g., 3G, 4G, 5G), radio, etc.

The device 200 can also comprise a unit 226. Unit 226 can be representative of a variety of components which can be coupled to the device 200, or to which the device can 200 couple. For instance, unit 226 can comprise an external battery pack and can attach to attachment point 210. In another embodiment, unit 226 can comprise a sensing unit (e.g. external sensor such as a temperature sensor, light sensor, humidity sensor, pressure sensor, liquid sensor, etc.)

In other embodiments, unit 226 is representative of a mounting bracket which an facilitate attachment of the device 200 to a wall or external fixture, which can assist in stabilizing the device 200 when attached to a pipe or utility line.

Device 200 can additionally comprise A.I. functionality, as will be later discussed in greater detail. Likewise, device 200 can comprise a user interface which will be later discussed in greater detail.

A variety of materials can be utilized in the device 200. For instance, the device 200 can comprise at least one of cast iron, PVC (polyvinyl chloride), chromed brass, chromed copper, galvanized iron, copper (rigid and flexible), CPVC (chlorinated polyvinyl chloride), PEX (cross-linked polyethylene), black iron, various plastics, etc.

Figure 3:
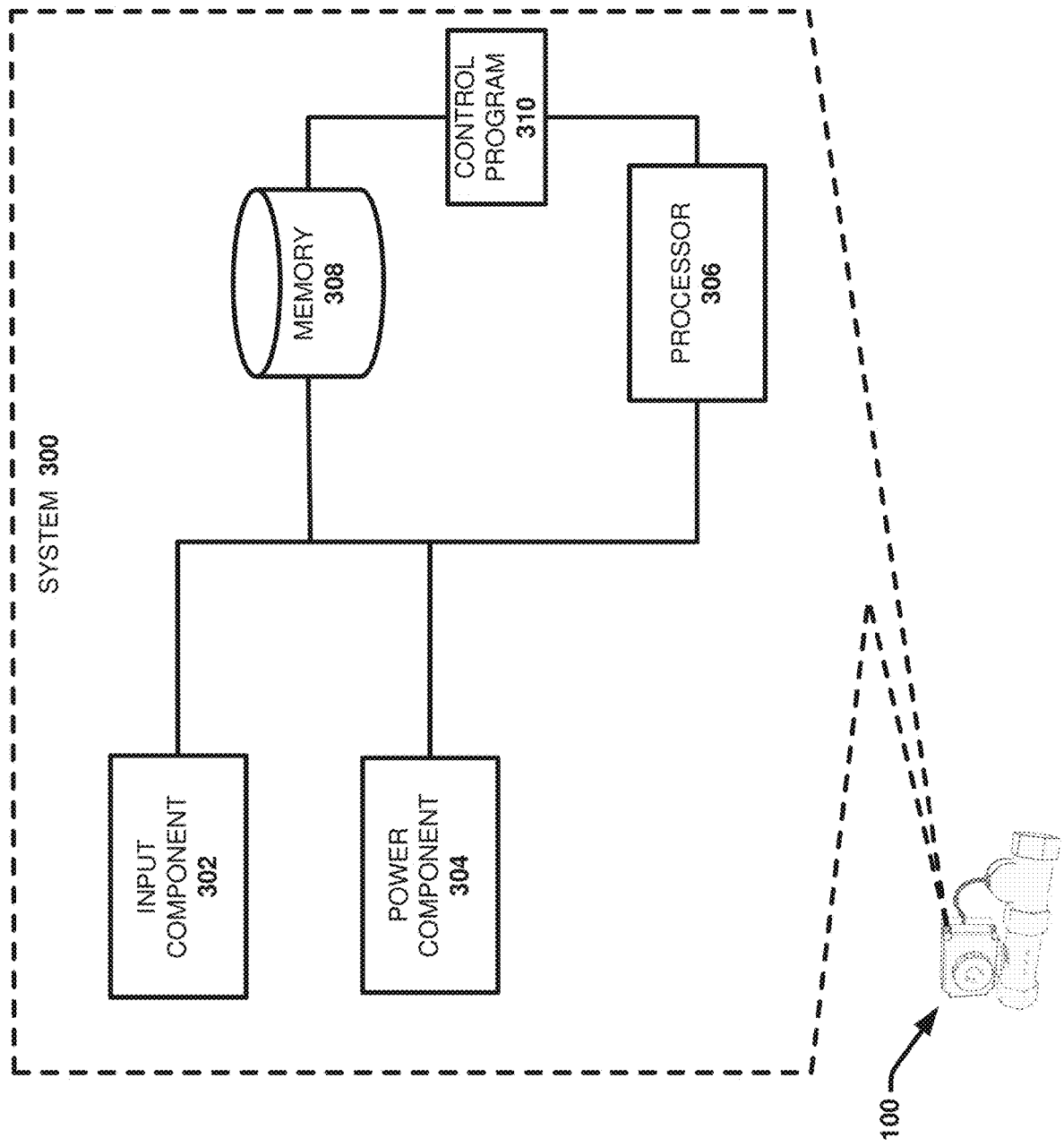
FIG. 3 is a block diagram of an example system that monitors flow and generate power in accordance with one or more example embodiments described herein.

Turning now to FIG. 3, a block diagram of a system 300 that can monitor flow or can generate power is depicted. The system 300 can be, for instance, a controller of a device 100 as shown, a controller of a device 200, or a different system. System 300 can comprise an input component 302, a power component 304, a processor 306, a memory 308, and a control program 310.

The input component 302 can comprise, for instance, a sensor. Exemplary sensors of input component 302 includes liquid sensors, gas sensors, carbon monoxide sensor, smoke sensors, orientation sensors, position sensors, pressure sensors, proximity sensors, touch/bump sensors, inertia sensors, acoustic sensors, optical sensors, light sensors, thermal sensors, speed sensors, sound sensors, vibration sensors, chemical sensors, humidity sensors, volt/amp/watt sensors, etc. In other embodiments, input component 302 can comprise a physical input object, such as a knob 106. Other embodiments can utilize other physical input objects such as buttons or switches. Further embodiments can utilize input components such as touch screens, microphones for voice control, etc.

System 300 can comprise a power component 304. Power component 304 can comprise, for instance, a battery. The battery can be replaceable, and preferably can be rechargeable. According to an embodiment, the power component 304 can comprise a capacitor. In other embodiments, the power component 304 can supply power to an external device, such as a mobile device (e.g. computers, smartphones, tablets, cameras, PDA's, etc.) or any device capable of receiving a charge as would be understood by one skilled in the art. In further embodiments, the power component 304 can comprise multiple components. For example, power component 304 can comprise a battery and a battery charger. The battery charger can charge the battery from an external power source or from power generated by a generator coupled to the system 300. Additionally, the power component 304 can supply power to an external device via power generated by the generator.

The system 300 can comprise a processor 306 that can facilitate respective analysis of information related to flow monitoring and power. The processor 306 can analyze conditions or modify parameters based on data received and controls one or more components of the system 300. According to an embodiment, the processor 306 can facilitate operations of a control program 310 stored on a memory 308. Control program 310 can execute a variety of function of the system 300. For instance, the control program 310 can designate where to send electricity generated by a generator coupled to the system 300. According to another embodiment, the control program 310 can cause components such as a turbine, valve, wall, or other component to allow or prevent flow through a flow passage to occur.

According to yet another embodiment, the control program 310 interact with peripheral devices, such as a sensor or another system 300. Other embodiments utilize wireless communication protocols to facilitate communication between components and devices. The control program 310 can cause the processor 306 to write data to the memory 308. For instance, information gathered by a sensor communicatively coupled to the system 300 can be received by the processor 306 or control program 310. The information gathered by the sensor of the input component 302 can be stored on the memory 308, as directed by the processor 306 or the control program 310.

The control program 310 can be configured to communicate with external programs, such as a mobile application, web application, computer program, or other software registered with the control program 310. For instance, a user can interface with a device 100 (or device 200 or another device) via a mobile application on a smartphone. The mobile application can cause information to be sent to/from the smartphone and the device 100. The device 100 (or 200) by way of the control program 310 can allow for "smart home" system (e.g., Amazon Alexa, Google Home, Apple® HomeKit™, etc.) integration. Such integration can allow for control of the system 300 and device 100 (or device 200), as well as monitoring and tracking of analytics associated with power generation and monitoring, as will be further discussed in greater detail.

Figure 4:
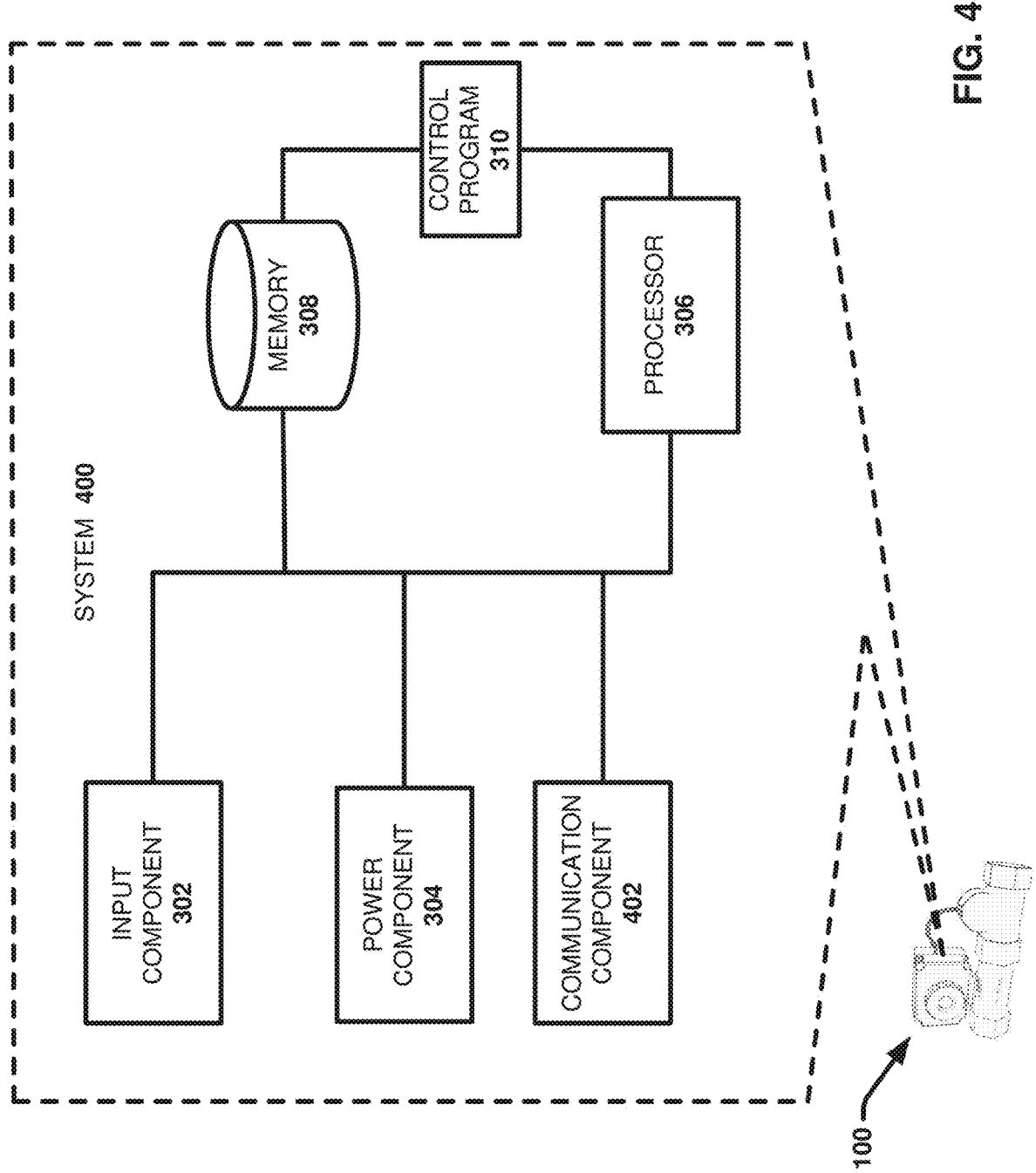
FIG. 4 is a block diagram of an example system that monitors flow and generate power in accordance with one or more example embodiments described herein.

Turning now to FIG. 4, a block diagram of a system 400 that can monitor flow or can generate power is depicted. The system 400 can be, for instance, a controller of a device 100 as shown, a controller of a device 200, or a different system. System 400 can comprise an input component 302, a power component 304, a processor 306, a memory 308, a control program 310, and a communication component 402. The communication component 402 can facilitate or receive a variety of communications. The communication component 402 can facilitate commutations directly through by wire or over the air (OTA) via different possible methods. For example, communication component 402 can communicate via IR, shortwave transmission, NFC, Bluetooth, Wi-Fi, LTE, GSM, CDMA, 2G, 3G, 4G, 5G, satellite, visual cues or radio signals among others. The communication component 402 can communicate with other devices, such as power generators or flow monitors, to create a network of devices. For instance, a network of devices 100, each comprising a system 400 can aggregate data corresponding to monitored flow. In other embodiments, a network of devices 100 can communicate to determine total power generation across the network of devices 100. Further embodiments can allow the network of devices 100 to aggregate power generated to supply the aggregated power to one or more sources, such as a battery or a receiver device.

A control program 310 can utilize the communication 402 to communicate with smart home systems or other systems. Communication component 402 can additionally send or receive messages. For instance, communication component 402 can generate a text (SMS) message, a push notification, or an e-mail to a user registered with the system 400. The text message, push notification, or email can contain information such as power generation levels, material flow characteristics, system errors/faults, or other information relevant to the system 400.

Figure 5:
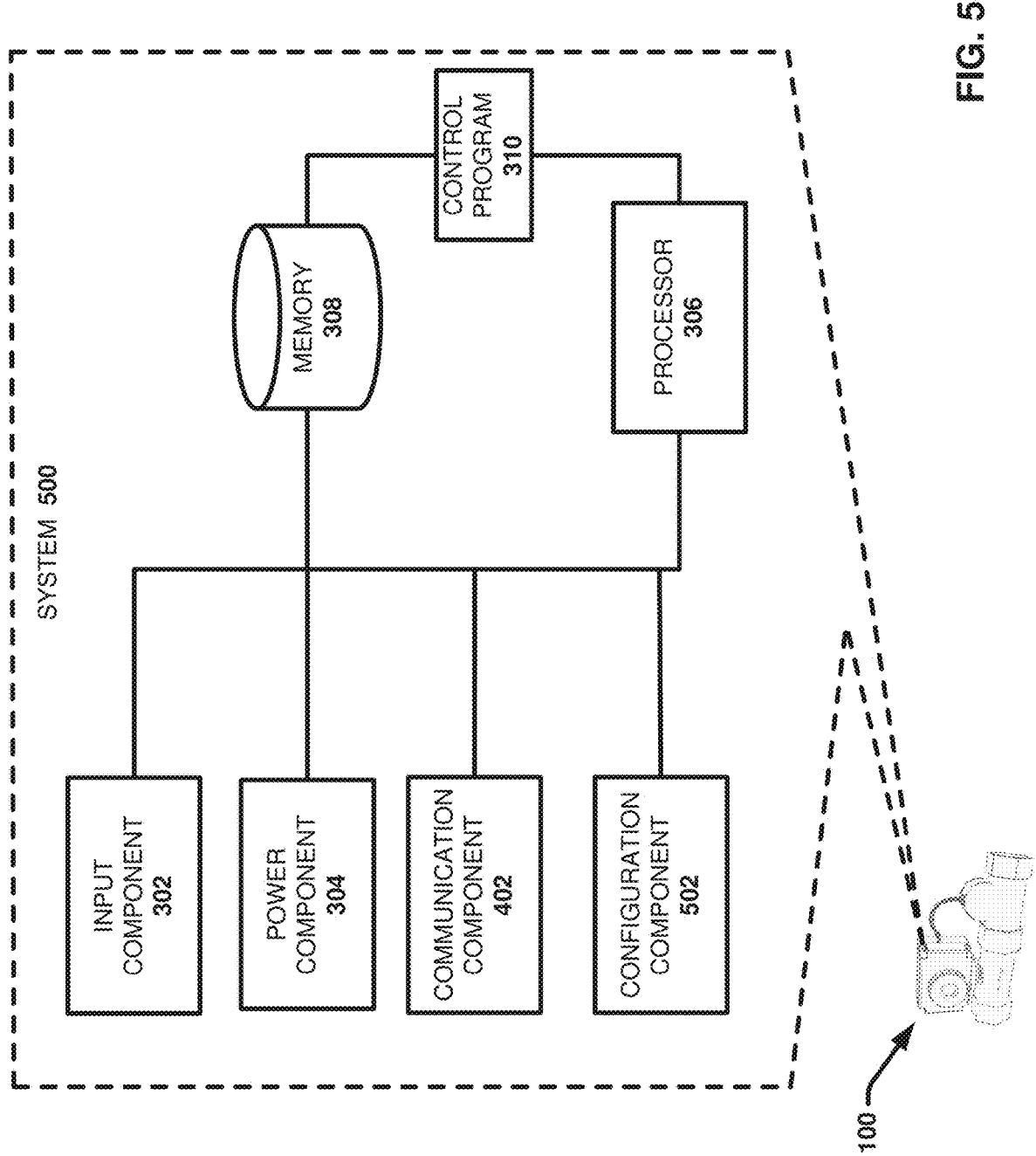
FIG. 5 is a block diagram of an example system that monitors flow and generate power in accordance with one or more example embodiments described herein.

With reference to FIG. 5, a block diagram of a system 500 that can monitor flow or can generate power is depicted. The system 500 can be, for instance, a controller of a device 100 as shown, a controller of a device 200, or a different system. System 500 can comprise an input component 302, a power component 304, a processor 306, a memory 308, a control program 310, a communication component 402, and a configuration component 502. The configuration component 502 can change or adjust various parameters of the system 500 or the device 100. The configuration component 502 can additionally be considered, for example, a regulation component 502. For instance, configuration component 502 can determine and apply various configuration settings of the system 500 or the device 100. For example, the configuration component can receive user preferences or other system preferences and can cause a device 100, device 200, or other device to stop or reduce flow by changing a parameter of a turbine, gate, or component that can influence flow. For instance, a user may program, remotely or at the system 500, a schedule for flow to be stopped or reduced. The configuration component 502 can respond to the schedule to change configurations of the device 100, 200, or system 500.

The configuration component 502 can adhere to a schedule which can be preset or user-configured. For instance, power may be configured to be generated in response to a certain condition (e.g. time of day, day of week, etc.) The communication component 402 can be utilized to adjust the configuration component 502. For instance, a user can remotely send a signal which can be received by the communication component 402. The signal can comprise an instruction to change a configuration, which can thereby be executed by the configuration component 502.

According to an embodiment, the configuration can adjust the behavior of a power component 304. For instance, the power component 304 can be caused to change from storing power to a battery to outputting power to a receiver (e.g. smartphone, tablet, etc.) in response to a configuration change by the configuration component 502. Per an embodiment, the control program 310 can interface with a configuration component 502 such that the control program 310 can change a configuration set by the configuration component 502.

Figure 6:
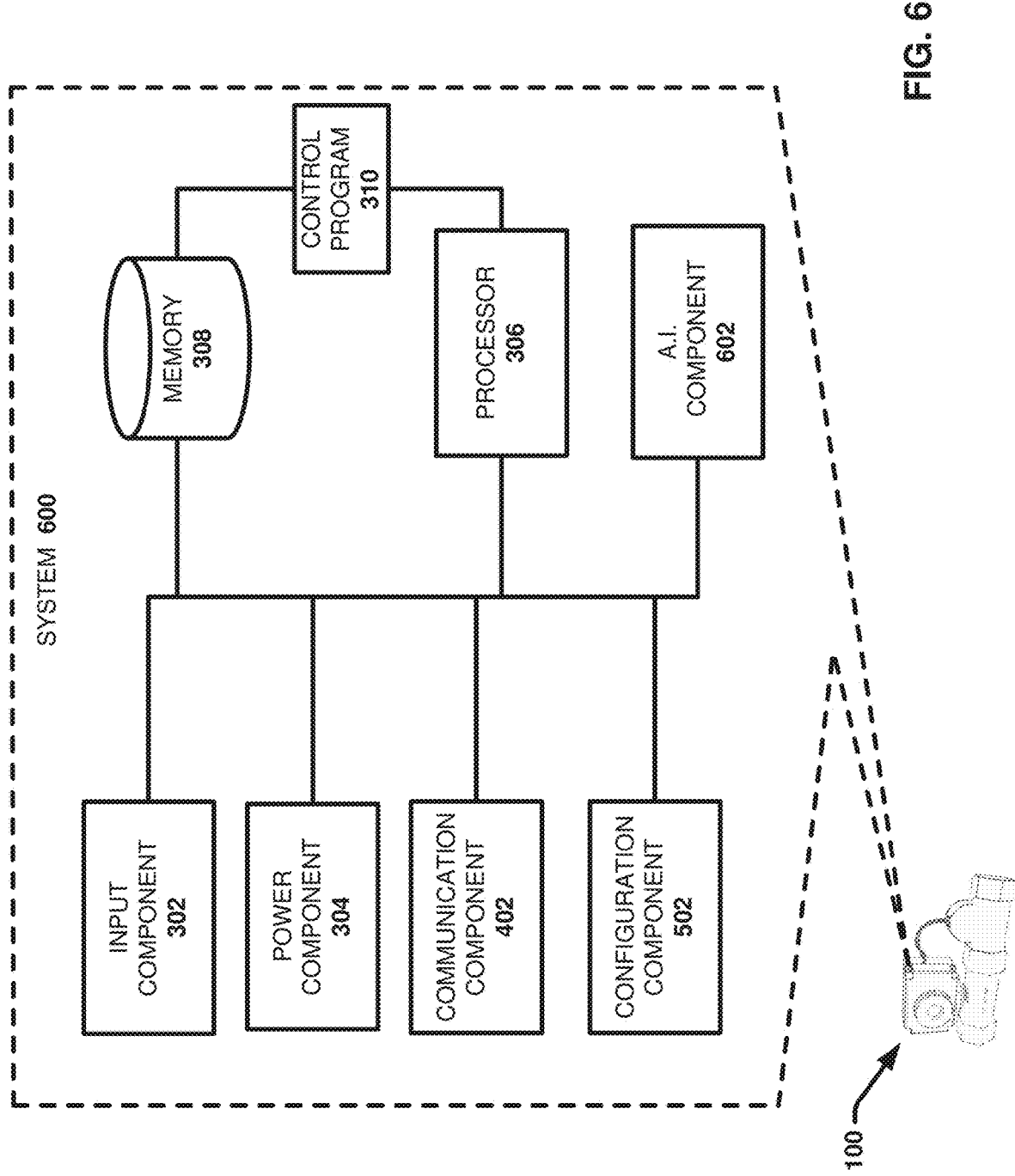
FIG. 6 is a block diagram of an example system that monitors flow and generate power in accordance with one or more example embodiments described herein.

Turning now to FIG. 6, a block diagram of a system 600 that can monitor flow or can generate power is depicted. The system 600 can be, for instance, a controller of a device 100 as shown, a controller of a device 200, or a different system. System 600 can comprise an input component 302, a power component 304, a processor 306, a memory 308, a control program 310, a communication component 402, a configuration component 502, and an artificial intelligence (A.I.) component 602.

The A.I. component 602 can perform classifications, correlations, inferences and/or expressions associated with principles of artificial intelligence. For instance, the A.I. component 602 can employ an automatic classification system and/or an automatic classification. In one example, the A.I. component 602 can employ a probabilistic and/or statistical-based analysis (e.g., factoring into the analysis utilities and costs) to learn and/or generate inferences. The A.I. component 602 can employ any suitable machine-learning based techniques, statistical-based techniques and/or probabilistic-based techniques. For example, the A.I. component 602 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the A.I. component 602 can perform a set of machine learning computations. For example, the A.I. component 602 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations.

According to an embodiment, the A.I. component 602 can analyze flow patterns, input patterns, or determine other analytics associated with a device 100, device 200, or another device. For instance, multiple products may be powered by a device 100 or a device 200 generating electricity from water flow, natural gas flow, or other flow. The A.I. component 602 can analyze the power needs of those products and direct power based on A.I. learning. For instance, during the daytime, the A.I. component 602 may cause energy to be stored in a battery, while at night time, the A.I. component 602 may charge a product such as a smartphone, since a user of the smartphone could be sleeping.

According to yet another embodiment, the A.I. component 602 can make recommendations to users of the system 600. For instance, the A.I. component 602 can make recommendations for energy savings (e.g. reduced natural gas consumption) or for reduced water consumption.

The A.I. component 602 can provide an input to the configuration component 502. For instance, based on machine learning, the A.I. component 602 can cause the configuration component 502 to change to optimal settings to maximize power generation and reduce any undesired impact on material flow. For example, the A.I. component 602 can determine that pressure is low in a pipe. Based upon said determination, the A.I. component 602 can stop power generation in order to maintain maximum material flow and can cause the communication component 402 to generate an alert (e.g. phone call, text message, e-mail, push notification, etc.) A.I. component 602 can otherwise utilize the communication component 402 to communicate other information relating to the system 600.

According to an embodiment, inputs received at the input component 302 can be monitored by the A.I. component 602 to further facilitate machine learning.

Figure 7:
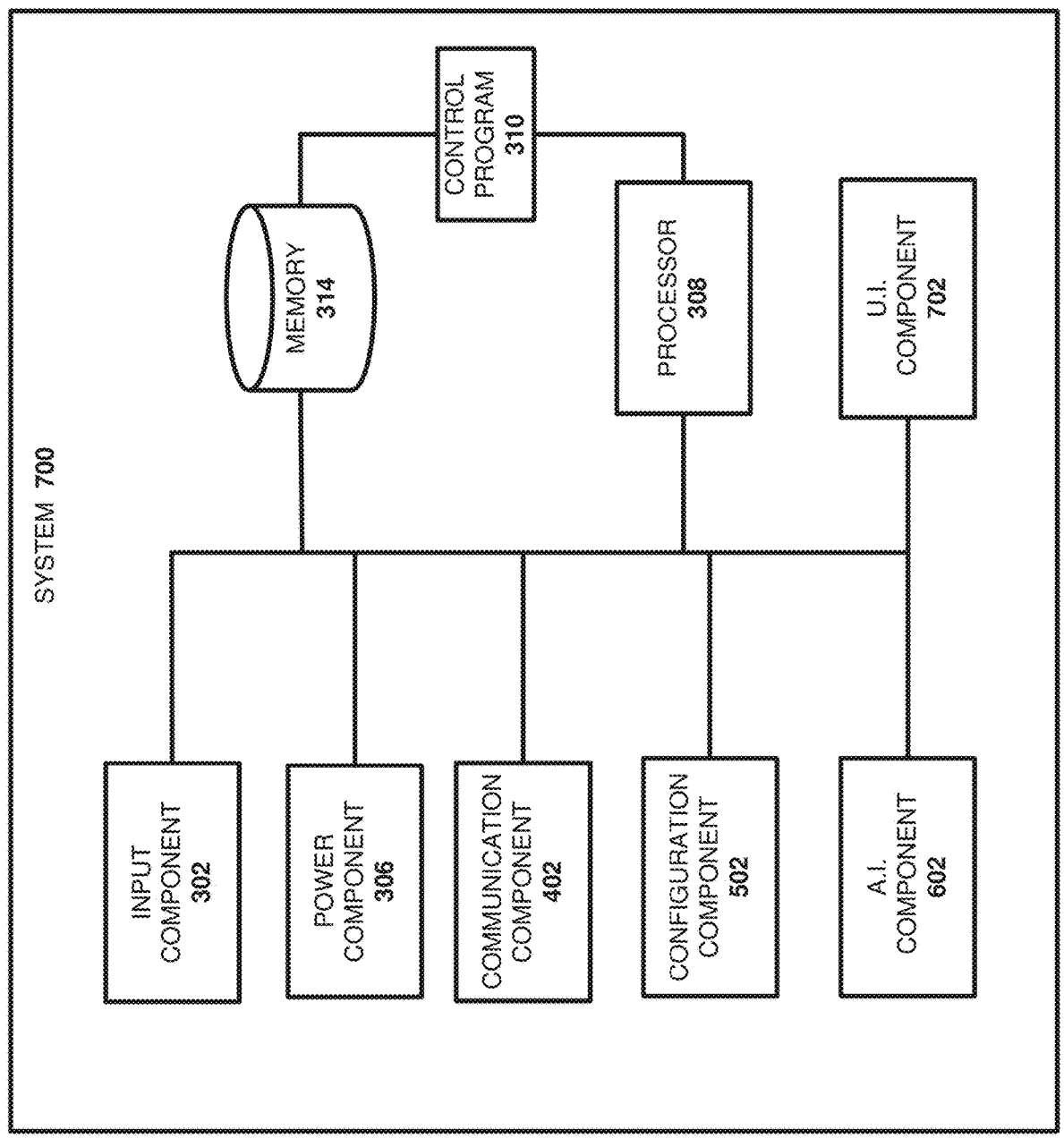
FIG. 7 is a block diagram of an example system that monitors flow and generate power in accordance with one or more example embodiments described herein.

With reference now to FIG. 7, a block diagram of a system 700 that can monitor flow or can generate power is depicted. The system 700 can be, for instance, a controller of a device 100 as shown, a controller of a device 200, or a different system. System 700 can comprise an input component 302, a power component 304, a processor 306, a memory 308, a control program 310, a communication component 402, a configuration component 502, an A.I. component 602, and a user interface (U.I.) component 702.

U.I. component 702 can perform or facilitate a variety of user-interface functionality. For instance, U.I. component 702 can comprise screen(s), button(s), switch(es), knob(s), lever(s), haptic feedback, audible feedback, visual feedback, etc. According to an embodiment, the U.I. component 702 can display information corresponding to the system 700. Said information can include, for instance, a charge level or charge rate of a power component 402 (e.g. battery) or external device coupled to the system 700. The information displayed can include a flow rate of material flowing through a pipe or utility line. The U.I. component 702 can enable user-input for the system 700. For instance, the U.I. component 702 can allow a user to change a setting of the system 700, such as allowing, preventing, or reducing material flow. The U.I. component 702 can change configurations for a configuration component 502.

According to an embodiment, U.I. component 702 can cause the configuration component 502 to change configurations. For example, a user can interface with the U.I. component 702 which can cause the configuration component 502 to change configurations, from preconfigured configurations or user-customized configurations. Additionally, the U.I. component 702 can be utilized to retrieve, store, copy, modify, or delete data stored in a memory 314.

According to yet another embodiment, the U.I. component 702 can interface with the communication component 402. For example, a user interacting with the U.I. component 702 can cause the communication component 402 to send or receive a signal, such as downloading a software update, or sending data stored by the control program 310 or in the memory 314. The U.I. component 702 can operate using the control program 310 as an operating system or can otherwise operate, for instance, using its own software.

According to an embodiment, the U.I. component 702 can make adjustments to the input component 302. For example, the U.I. component 702 can modify a hierarchy of sensors or can enable or disable a sensor associated with the input component 302.

According to another embodiment, the U.I. component can comprise a portal for user interface with the control program 310. For instance, the comprise screen(s), button(s), switch(es), knob(s), lever(s) can be utilized for user-interaction with the control program 310.

Figure 8:
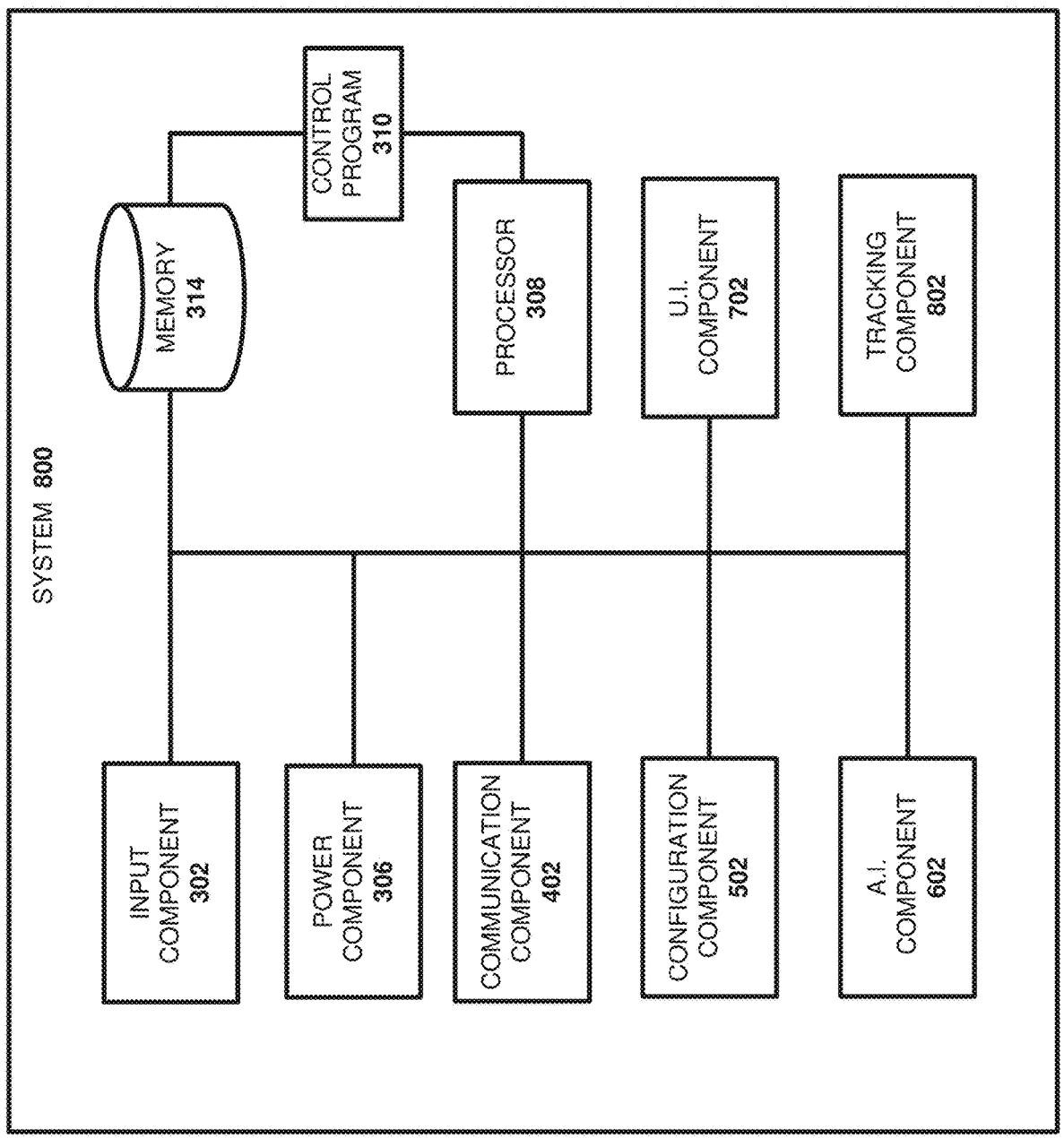
FIG. 8 is a block diagram of an example system that monitors flow and generate power in accordance with one or more example embodiments described herein.

Referring now to FIG. 8, a block diagram of a system 800 that can monitor flow or can generate power is depicted. The system 800 can be, for instance, a controller of a device 100 as shown, a controller of a device 200, or a different system. System 800 can comprise an input component 302, a power component 304, a processor 306, a memory 308, a control program 310, a communication component 402, a configuration component 502, an A.I. component 602, U.I. component 702, and a tracking component 802.

Tracking component 802 can track various metrics associated with a system 800. Such metrics can be utilized by the A.I. component 602, U.I. component 702, communication component 402, or any other component of system 800.

According to an embodiment, the tracking component 802 can be utilized to track and record characteristics of material flow. For instance, a device 100 comprising the system 800 can be coupled to a utility line (e.g., water, natural gas, sewage, etc.) The tracking component 802 can receive information from a sensor of the input component 302 and can determine flow rate, flow volume, etc. For example, the tracking component 802 can monitor the number of rotations of a turbine over a period of time to determine a material flow rate. Problems can be recognized by the tracking component 802, A.I. component 602, control program 310, or otherwise identified. Problems can include as low pressure, high pressure, inadequate flow, etc. in relation to threshold values.

According to an embodiment, the tracking component 802 can collect data from various sources. The tracking component 802 can make tracked data available to other components, such as the A.I. component 602 to improve machine learning accuracy or U.I. component 702 to provide a user with additional functionality for interfacing with the system 800. The tracking component 802 can store data to the memory 314 or can possess its own memory. According to an embodiment, the tracking component 802 can utilize a dedicated partition of the memory 314.

Tracking component 802 can comprise its own processor and memory or can utilize processor 308 and memory 314. Tracking component 802 can collect information such as power state, material flow, power generation, system status, etc. The tracking component 802 can utilize the communication component 502 to send tracked data to, for instance, a manufacturer of the system 800 for diagnostic purposes. Other embodiments include a tracking component 802 which can send metrics to a manufacturer of the system 800 or a third party, such as a utility company suppling material through the pipe to which the system 800 is attached (or utility line to which a device 100 or device 200 comprising the system 800 is attached). This can enable a manufacturer or a utility company to perform remote diagnostics on the system 800, device 100, device 200, or a pipe or utility line. Additional embodiments can allow for information gathered by the tracking component 802 to be utilized for marketing or customer profile generation. Such information can allow a manufacturer or utility company (or other entity) gain insight into customer patterns to help provide better customer service or help match a customer with future product offerings or can be otherwise used.

The A.I. component 602 can utilize data gathered by the tracking component 802 as a source of information to facilitate machine learning. The tracking component 802 can comprise a primary or supplementary source of information for the A.I. component 602.

It can be appreciated that the configuration component 502 can utilize information gathered by the tracking component 802 to associate configurations with data gathered by the tracking component 802. This can enable, for instance, a U.I. component 702 to display the configurations with the data associated with said respective configurations.

Figure 9:
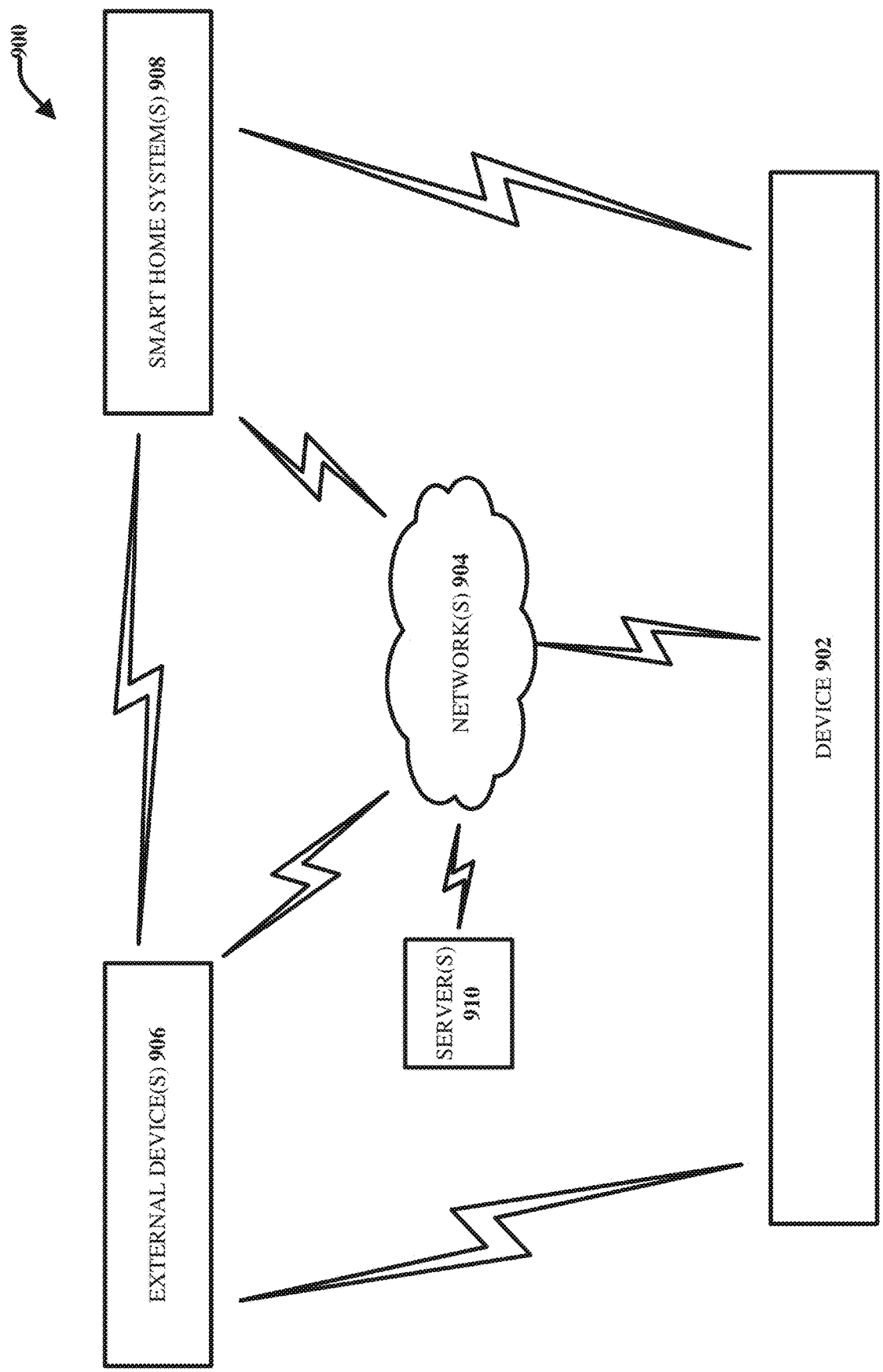
FIG. 9 is a block diagram of an example system that monitors flow and generate power in accordance with one or more example embodiments described herein.

Turning now to FIG. 9, depicted is a diagram representative of communication between components of a system 900. System 900 can comprise a device 902, network 904, external device(s) 906, smart home system(s) 908, and server(s) 910.

A device 902 can comprise a device similar to device 100, device 200, or another device for monitoring flow or generating power or otherwise related to flow monitoring or power generation. The device 902 can comprise any one of systems 500, 600, 700, 800, etc. A network 904 can comprise, for instance, IR, shortwave transmission, NFC, Bluetooth, Wi-Fi, LTE, GSM, CDMA, 2G, 3G, 4G, 5G, satellite, visual cues or radio signals among others. An externa device 906 can comprise, for instance, computers, smartphones, tablets, cameras, PDA's, etc. A smart home system 908 can comprise, for instance, Amazon Alexa, Google Home, Apple® HomeKit™, etc. In a system 900, the device 902, network 904, external device(s) 906, and smart home system(s) 908 can each communicate with one another, enabling information sharing between all components (device 902, external device(s) 906, smart home system(s) 908, etc.)

According to an embodiment, network(s) 904 can comprise multiple networks. For instance, an external device 906 can comprise a smartphone utilizing a cellular (e.g. 4G, 5G, etc.) network 904 for communication, while a device 902 and smart home system 908 are connected to a home network 904 utilizing Wi-Fi. Devices, systems, and components of the system 900 operating on different network types, as in the above example, can utilize, for instance, a server 910 to send and receive data from a device using a first network and to send and receive data from a device using a second network. As in the above example, the control server 910 can receive information from a smartphone 906 operating on a 4G cellular network 904 and can communicate said information to the device 902 connected to a home network 904 utilizing Wi-Fi.

A server 910 can reside, for instance, at a remote location. According to an embodiment, the server 910 can facilitate remote backups of information stored in a device 902 (or external device 906, smart home system 908, or another device).

Figure 10:
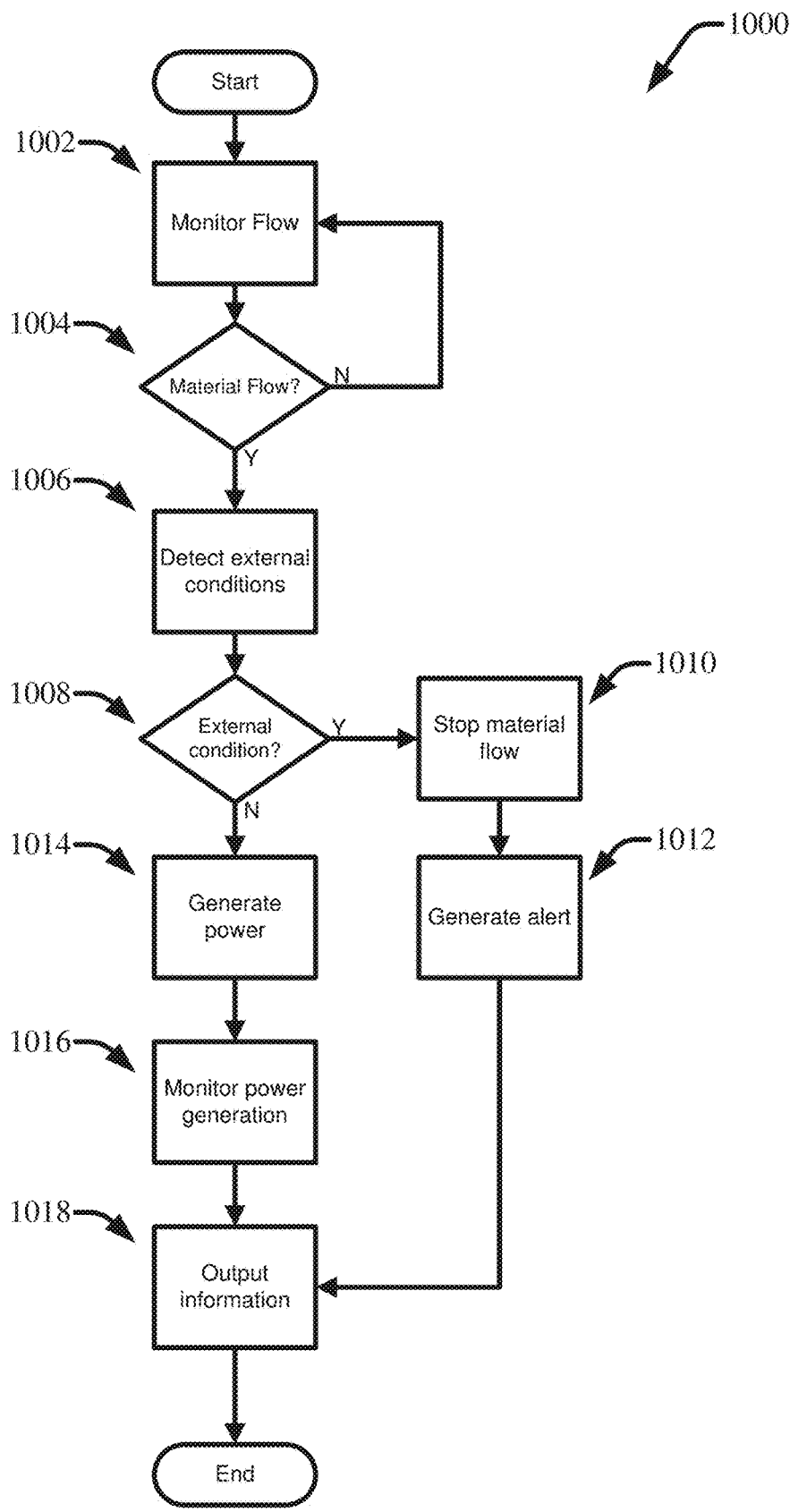
FIG. 10 is a flowchart of an example method for monitoring flow and generating power in accordance with one or more example embodiments described herein.

Referring now to FIG. 10, a flowchart of a process 1000 for flow monitoring and power generation is shown. At 1002, flow is monitored, for instance, by a device 100 or a device 200 or another device which can comprise any of systems 500, 600, 700, 800, 900, etc. If at 1004, is material flow is not detected, the system returns to 1002. If at 1004, material flow is detected, the system proceeds to 1006. At 1006, a presence of an external condition can be detected. External conditions can include a fire inside a structure containing the device 100 or device 200, water inside a structure (flood) containing the device 100 or device 100, material leak inside a structure containing the device 100 or device 200, etc. External conditions can be detected, for instance by an input component 302 comprising a sensor. If an external condition is detected at 1008, the system can proceed to 1010. At 1010, material flow is stopped (e.g. by a valve, generator, turbine, door, etc. of a system 100, system 200, or of another system). At 1012, an alert is generated. The alert can be broadcast at the system or at a different location. For instance, an alert can be broadcast over a speaker coupled to the system at a U.I. component 702 or other component of the system. Other embodiments can include alerts being sent over a network, (e.g. network 904) to allow an alert to be broadcast at a receiver, such as a smart home system, computers, smartphones, tablets, cameras, PDA, etc. If at 1008, an external condition is not detected, power can be generated at 1014. Power can be generated, for instance, by a generator 206. At 1016, the power generated can be monitored. Preferably, but not necessarily, power generated at 1014 continues to be generated during power monitoring at 1016. At 1018, information is input comprising, for instance, information gathered during the monitoring of power generation at 1016.

Figure 11:
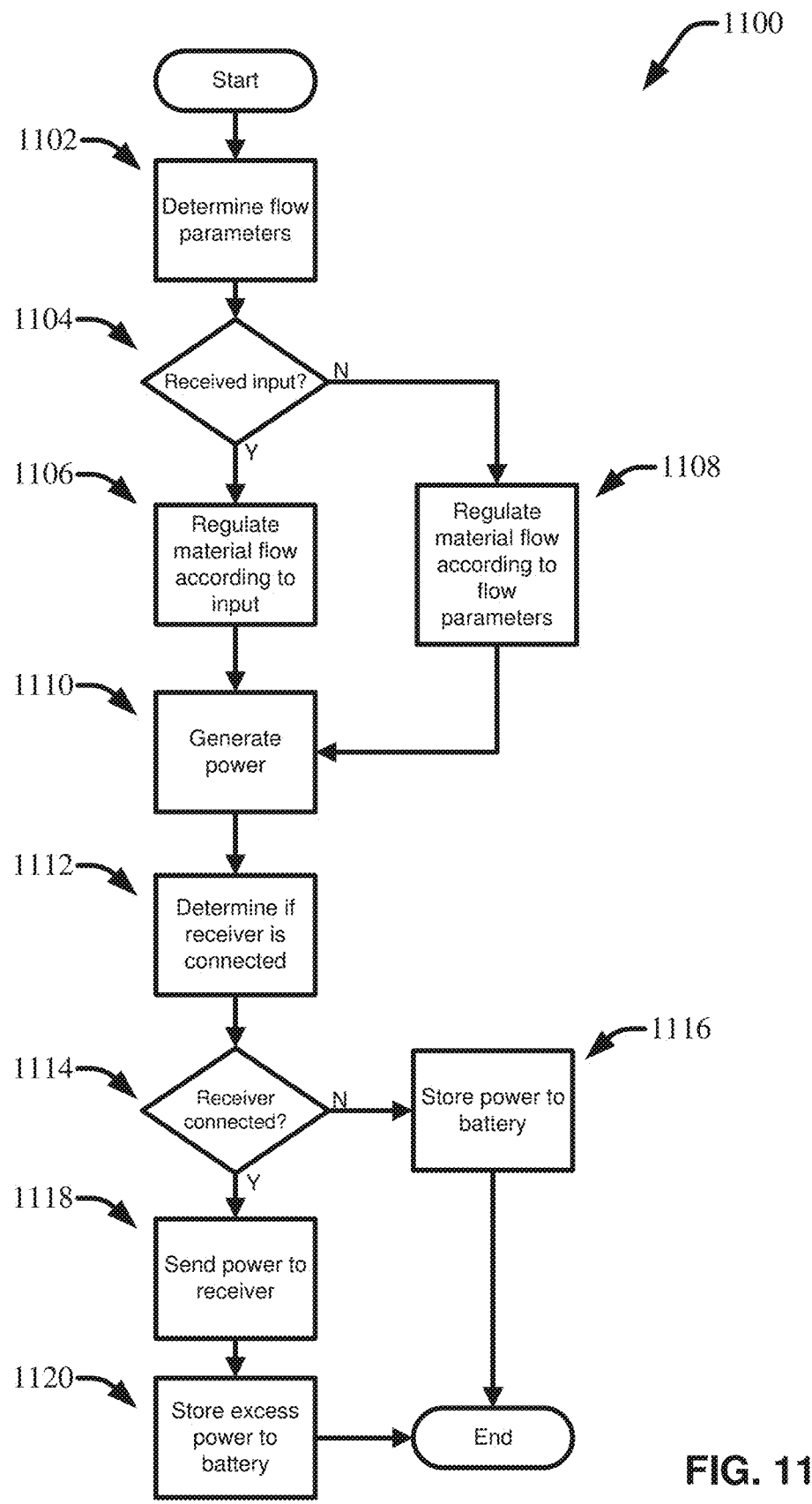
FIG. 11 is a flowchart of an example method for monitoring flow and generating power in accordance with one or more example embodiments described herein.

Turning now to FIG. 11, a flowchart of a process 1100 for flow monitoring and power generation is shown. At 1102, flow parameters can be determined. Flow parameters can comprise, for instance, preferences set by a user of a system 100, 200, or another system (which can comprise any of systems 500, 600, 700, 800, 900, etc.), an A.I. component 602, or can be otherwise determined or set at 1102. At 1104, a system can determine whether an input has been received. The input can comprise, for instance, a command to change a flow parameter received by an input component 302 or a communication component 402. The command can come from an A.I. component 602, U.I. component 702, control program 310, etc. If at 1104, an input has been received, the system can proceed to 1106. If at 1104 an input has not been received, the system can proceed to 1108. At 1108, material flow can be regulated according to flow parameters existing at 1102. At 1106, material flow can be regulated according to the input received at 1104. At 1110, power can be generated in connection with the flow parameters of 1106 or 1108. At 1112, it is determined if a receiver, such as a smartphone to be charged, is connected to the system. If a receiver is not connected, the system proceeds to 1116, where power generated can be stored in a battery or capacitor of the system. If a receiver is connected, and the receiver is determined to be able to receive power from the system, the system can send power to the receiver at 1118. At 1120, surplus energy generated can be stored in the battery of the system.

Figure 12:
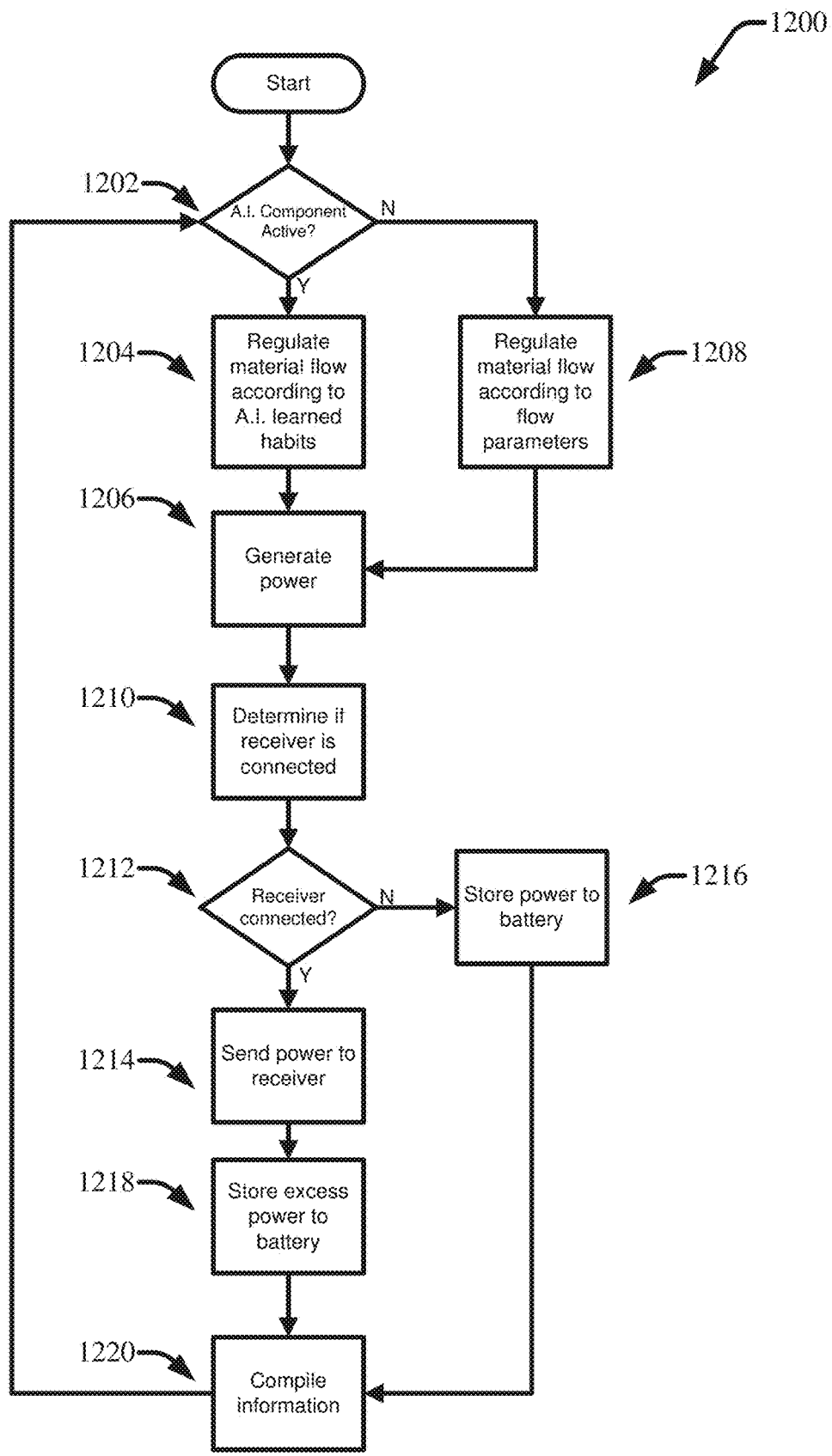
FIG. 12 is a flowchart of an example method for monitoring flow and generating power in accordance with one or more example embodiments described herein.

Turning now to FIG. 12, a flowchart of a process 1200 for flow monitoring and power generation is shown. At 1202, it is determined whether an A.I. component, such as A.I. component 602 is active. If at 1202, an A.I. component is not active, the system can proceed to 1208. At 1208, material flow can be regulated according to flow parameters of, for instance, a configuration component 502 or other set parameters. If at 1202, an A.I. component is active, the system can proceed to 1204, where material flow can be regulated according to A.I. learned patterns or habits, as previously discussed. At 1206, power can be generated. Power can be generated with, for example, a generator 206. It can be appreciated that power generation can occur so long as material flows through the system. At 1210, it can be determined whether a receiver, such as a tablet to be charged, is connected. If it is determined at 1212 that a receiver is not connected, power can be stored in a battery of the system at 1216. If it is determined at 1212 that a receiver is connected, power can be sent to the receiver at 1214. At 1218, excess power generated can be stored to a battery of the system. At 1220, information can be compiled by the A.I. component such that machine learning can be facilitated. In other embodiments, the tracking component 802 can collect or compile the information. It can be appreciated that information can be gathered by the A.I. component at any step of process 1200, and not only at 1220. Unless otherwise disabled, the system can return to 1202 with the additional learning achieved by the A.I. component.

Figure 13:
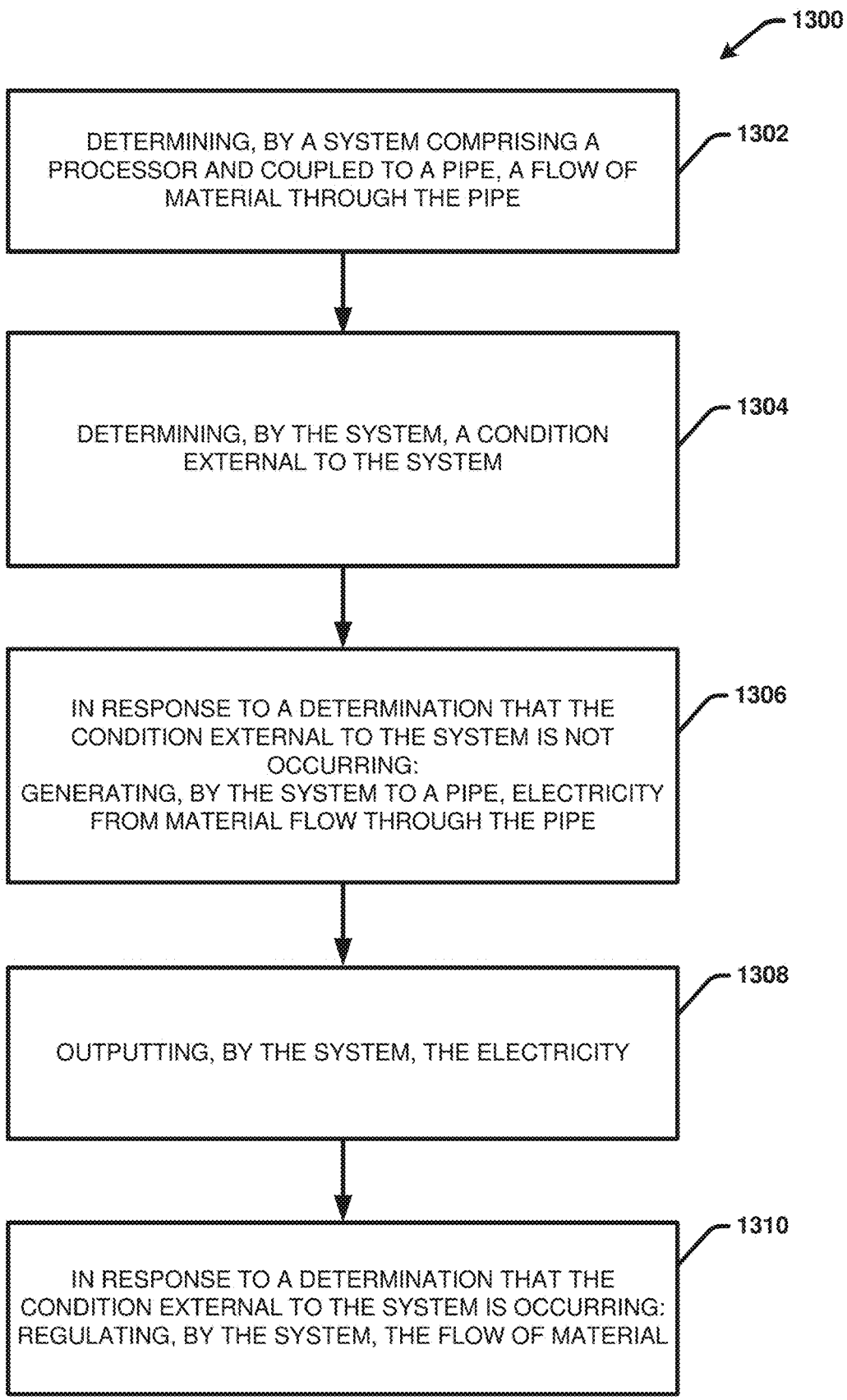
FIG. 13 is a block flow diagram for a process for a system that monitors flow and generates power in accordance with one or more example embodiments described herein.

Referring now to FIG. 13, a block flow diagram for a process for a system that generates power in accordance with one or more example embodiments is shown. At 1302, a system comprising a processor and coupled to a pipe can determine a flow of material through the pipe. At 1304, the system can determine a condition external to the system. At 1306, in response to a determination that the condition external to the system is not occurring, the system can generate electricity from material flow through the pipe. At 1308, the system can output the electricity. At 1310, in response to a determination that the condition external to the system is occurring, the system can regulate the flow of material.

It can be appreciated that a condition external to the system can comprise, for example, a detection of flooding by a sensor communicatively coupled to the system. Regulating can comprise stopping the flow of material through the pipe. The outputting can comprise powering a device coupled to the system.

Monitoring a volume of flow through the pipe can be conducted by the system. A signal comprising information determined during the monitoring can be output by the system.

Figure 14:
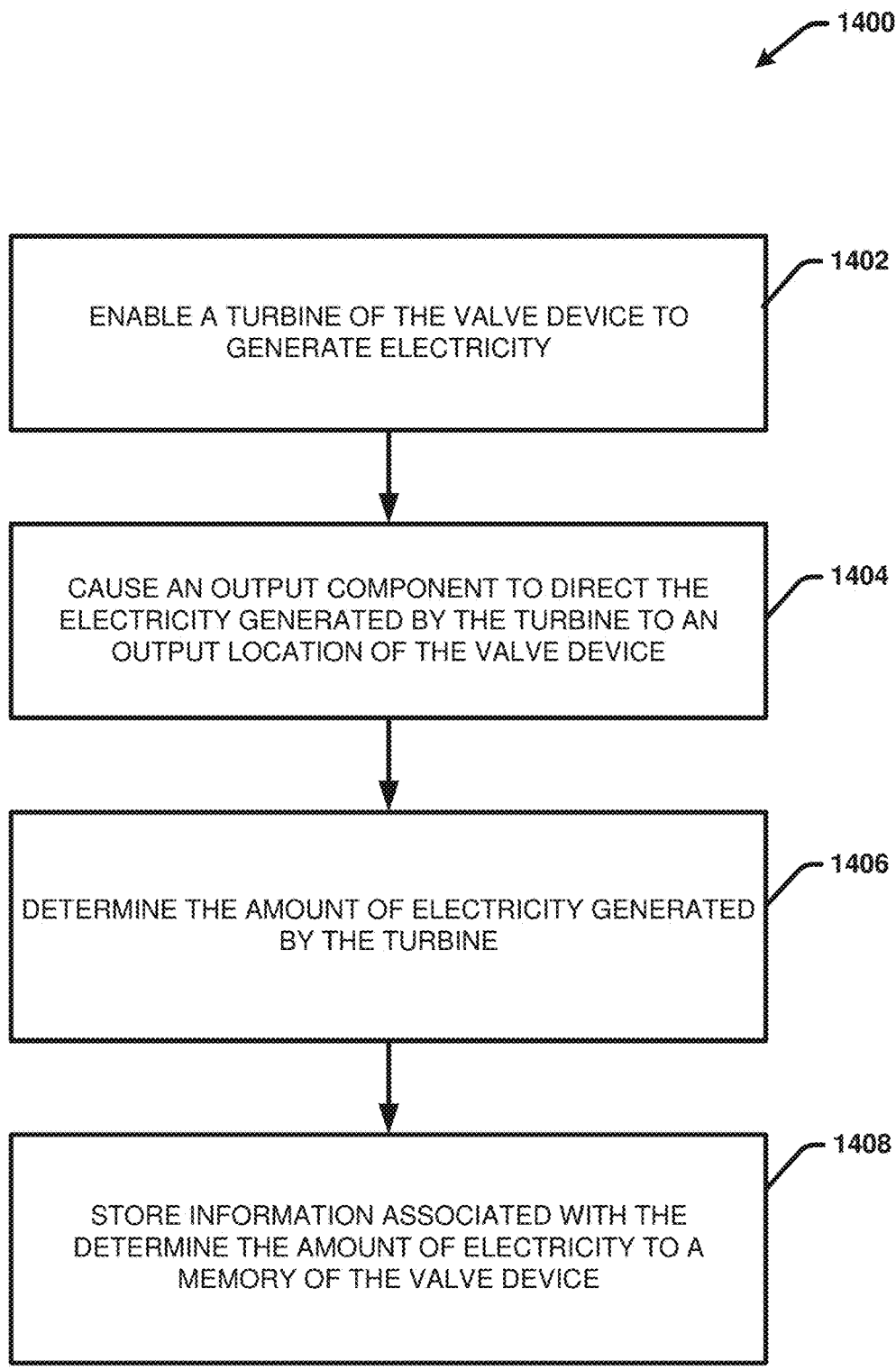
FIG. 14 is a block flow diagram for a process in which a system that regulates flow and generates power in accordance with one or more example embodiments described herein.

With reference to FIG. 14, a block flow diagram for a process for a system that generates power in accordance with one or more example embodiments is shown. At 1402, a turbine of a valve device can be enabled for generation of electricity. At 1404, an output component can be caused to direct the electricity generated by the turbine to an output location of the valve device. At 1406, the amount of electricity generated by the turbine can be determined. At 1408, information associated with determining the amount of electricity can be stored to a memory of the valve device.

Machine learning and artificial intelligence can be employed to determine relevance of the electricity generated to a context of the valve device in association with an external condition. Flow of a material through the valve device can be controlled using information determined during the machine learning. A signal can be generated corresponding to the information.

A regulation component can be enabled to slow or stop a flow of material through the valve device.

FIGS. 10-14 as described above illustrate respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 15:
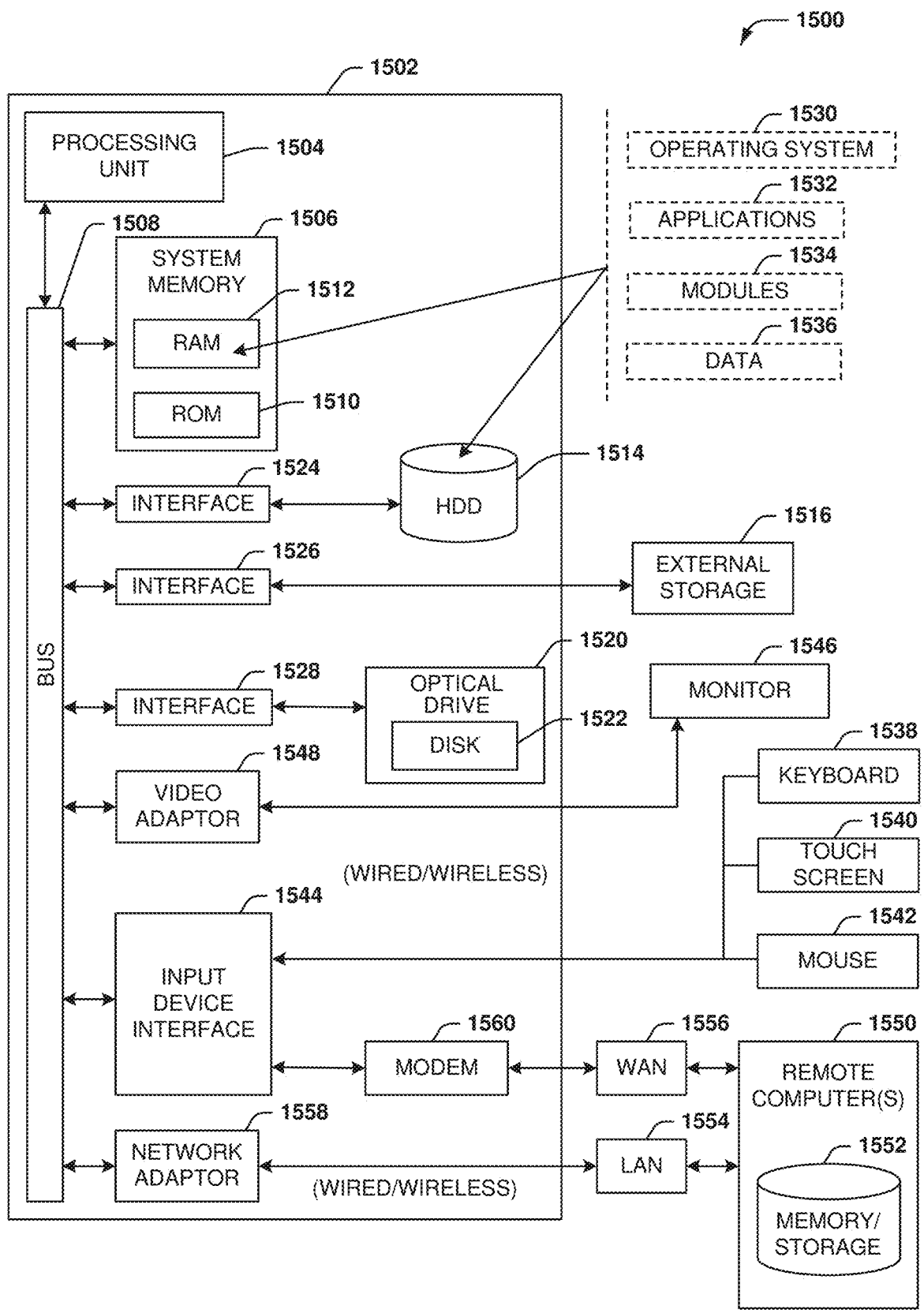
FIG. 15 is an example, non-limiting computing environment in which one or more example embodiments described herein can be implemented.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.) While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1694 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
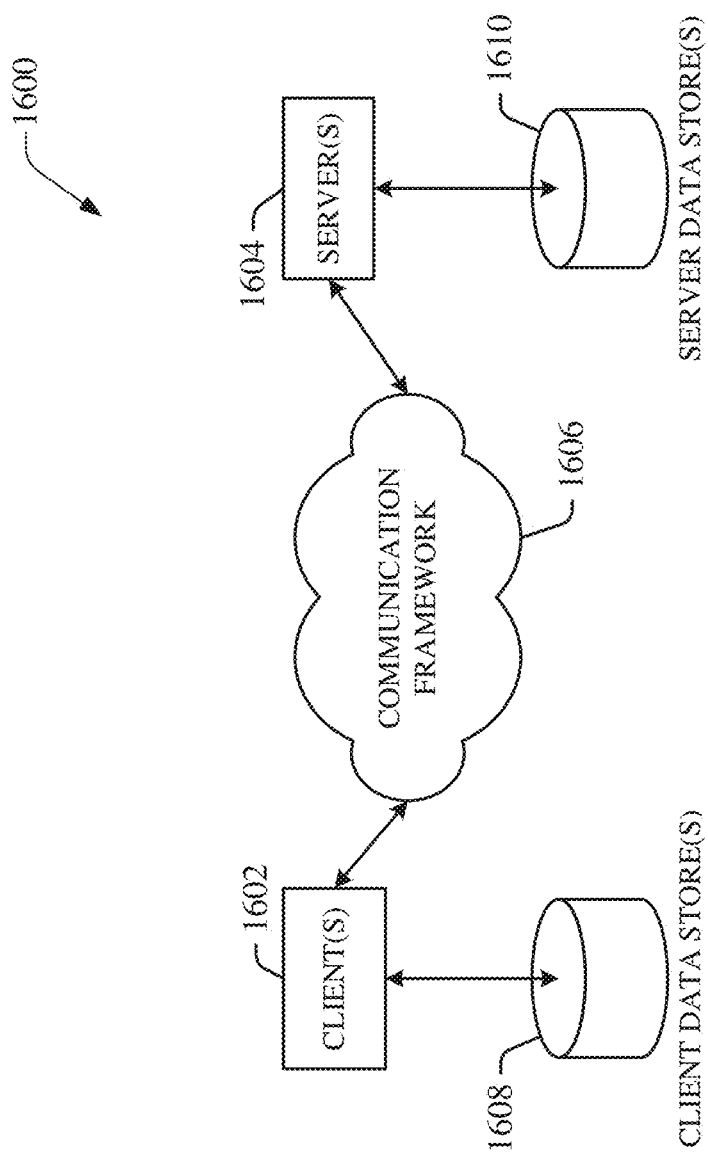
FIG. 16 is an example, non-limiting networking environment in which one or more example embodiments described herein can be implemented.

Referring now to FIG. 16, there is illustrated a schematic block diagram of a computing environment 1600 in accordance with this specification. The system 1600 includes one or more client(s) 1602, (e.g., computers, smartphones, tablets, cameras, PDA's). The client(s) 1602 can be hardware and/or software (e.g., threads, processes, computing devices). The client(s) 1602 can house cookie(s) and/or associated contextual information by employing the specification, for example.

The system 1600 also includes one or more server(s) 1604. The server(s) 1604 can also be hardware or hardware in combination with software (e.g., threads, processes, computing devices). The servers 1604 can house threads to perform transformations of media items by employing aspects of this disclosure, for example. One possible communication between a client 1602 and a server 1604 can be in the form of a data packet adapted to be transmitted between two or more computer processes wherein data packets may include coded analyzed headspaces and/or input. The data packet can include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

In one exemplary implementation, a client 1602 can transfer an encoded file, (e.g., encoded media item), to server 1604. Server 1604 can store the file, decode the file, or transmit the file to another client 1602. It is to be appreciated, that a client 1602 can also transfer uncompressed file to a server 1604 and server 1604 can compress the file and/or transform the file in accordance with this disclosure. Likewise, server 1604 can encode information and transmit the information via communication framework 1606 to one or more clients 1602.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
  a processor that executes computer executable components stored in a memory;
  a coupling component that secures the system to a pipe;
  a power generation component that generates power from material flowing through the pipe;
  a power storage component that stores power generated by the power generation component;
  a power output component that outputs power generated by the power generation component;
  a tracking component that tracks and records information relating to the system;
  an analysis component that analyzes the tracked and recorded information;
  an artificial intelligence component that learns power needs of an at least one product that receives power generated by the power generation component;
  a configuration component that determines a desired material flow;
  a regulation component that adjusts material flow through the pipe, wherein:
    when the artificial intelligence component is active, the regulation component adjusts material flow according to the learned power needs of the at least one product; and
    when the artificial intelligence component is not active, the regulation component adjusts material flow according to the desired material flow determined by the configuration component; and
  a power component that:
    in response to determining that a receiver is connected to the system, outputs the generated power to the receiver via the power output component; and
    in response to determining that a receiver is not connected to the system, stores the generated power via the power storage component.

2. The system of claim 1, further comprising:
a power storage component that stores power received from the power output component.

3. The system of claim 1, wherein the power generation component comprises a turbine generator.

4. The system of claim 1, wherein the material flowing through the pipe comprises natural gas.

5. The system of claim 1, wherein the material flowing through the pipe comprises water.

6. The system of claim 1, wherein the information further comprises a presence of water inside a structure containing the system.

7. The system of claim 1, further comprising: an artificial intelligence component that determines the relevance of the power generated to a context of the valve device in association with an external condition.

8. The artificial intelligence component of claim 7, wherein the relevance of the power generated is determined using machine learning.

9. The power generation component of claim 1, further comprising: a locking component which prevents a turbine from rotating.

10. The power generation component of claim 9, further comprising: a braking component which reduces rotational speed of a turbine.

11. The system of claim 1, further comprising: a replaceable battery that receives the power generated from material flowing through the pipe.

12. A method, comprising:
determining, by a system comprising a processor and coupled to a pipe, a flow of material through the pipe;
generating, by the system, power from material flowing through the pipe;
tracking and recording, by the system, information relating to the system;
analyzing, by the system, the tracked and recorded information;
learning, by the system, power needs of an at least one product that receives power generated by the system;
determining, by the system, a desired material flow of material flowing through the pipe;
adjusting, by the system, material flow through the pipe, wherein:
the material flow is adjusted according to the learned power needs of the at least one product; or
the material flow is adjusted according to a predetermined desired material flow; and
determining, by the system, whether a receiver is connected to the system, wherein:
where it is determined that a receiver is connected to the system, outputting, by the system, the generated power to the receiver; and
where it is determined that a receiver is not connected to the system, storing the generated power to a power storage device coupled to the system.

13. The method of claim 12, further comprising detecting a condition external to the system by a sensor communicatively coupled to the system.

14. The method of claim 12, wherein the adjusting comprises stopping the flow of material through the pipe.

15. The method of claim 12, further comprising:
monitoring, by the system, a volume of the flow through the pipe.

16. The method of claim 15, further comprising:
outputting, by the system, a signal comprising information determined during the monitoring.

17. The method of claim 12, wherein the outputting comprises powering a device coupled to the system.

18. A non-transitory computer readable program product that facilitates operations of a valve device, the computer program product comprising readable storage medium having program instructions embodied therewith, the program instructions executable by a processor to cause the processor to:
enable a turbine of the valve device to generate electricity;
determine a current flow of material through the valve device;
determine a desired flow of material through the valve device;
learn power needs of an at least one product that receives the electricity generated by the valve device;
determine whether a receiver is connected to the valve device, wherein:
when the receiver is connected, adjusting the flow of material according to the power needs of the at least on product;
when the receiver is not connected, adjusting the flow of material according to the determined desired flow of material through the valve device;
cause an output component to direct the electricity generated by the turbine to an output location of the valve device;
determine an amount of electricity generated by the turbine;
store information associated with the determined the amount of electricity to a memory of the valve device.

19. The non-transitory computer readable program product of claim 18, wherein the program instructions further cause the processor to:
employ machine learning and artificial intelligence to determine relevance of the electricity generated to a context of the valve device in association with an external condition.

20. The non-transitory computer readable program of claim 18, wherein the program instructions further cause the processor to:
generate a signal corresponding to the information.

* * * * *